US008594003B2

(12) United States Patent
Han et al.

(10) Patent No.: US 8,594,003 B2
(45) Date of Patent: Nov. 26, 2013

(54) METHOD OF ESTIMATING LOCATION OF MOBILE DEVICE IN TRANSPORTATION USING WIFI

(75) Inventors: Dong-Soo Han, Daejeon (KR); In-Je Lee, Jeonju-si (KR); Jong-Young Koo, Chungcheongnam-do (KR)

(73) Assignees: Visoft Ltd., Daejeon (KR); Kaist, Daejeon (KR)

( * ) Notice: Subject to any disclaimer, the term of this patent is extended or adjusted under 35 U.S.C. 154(b) by 224 days.

(21) Appl. No.: 13/092,449

(22) Filed: Apr. 22, 2011

(65) Prior Publication Data
US 2012/0170560 A1    Jul. 5, 2012

(30) Foreign Application Priority Data

Jan. 5, 2011    (KR) .................. 10-2011-0000978
Feb. 23, 2011    (KR) .................. 10-2011-0015899

(51) Int. Cl.
*H04B 7/00*    (2006.01)
(52) U.S. Cl.
USPC ........................................... 370/310
(58) Field of Classification Search
USPC .......... 370/310, 328, 331, 338; 455/421–423, 455/435, 436, 440–444
See application file for complete search history.

(56) References Cited

U.S. PATENT DOCUMENTS

| | | | |
|---|---|---|---|
| 7,164,911 B2 * | 1/2007 | Watanabe ................. 455/435.1 |
| 7,515,578 B2 * | 4/2009 | Alizadeh-Shabdiz et al. ............................. 370/338 |
| 7,532,604 B2 * | 5/2009 | Eglin ............................ 370/338 |
| 7,567,822 B2 * | 7/2009 | Hart et al. .................. 455/562.1 |
| 2004/0142657 A1 * | 7/2004 | Maeda ........................ 455/11.1 |
| 2007/0001904 A1 * | 1/2007 | Mendelson .................. 342/450 |
| 2008/0248741 A1 * | 10/2008 | Alizadeh-Shabdiz ....... 455/3.02 |
| 2009/0082034 A1 * | 3/2009 | Gray et al. ................. 455/456.1 |
| 2011/0217947 A1 * | 9/2011 | Czaja et al. ................ 455/404.1 |
| 2011/0257923 A1 * | 10/2011 | Boulton ....................... 702/117 |

* cited by examiner

*Primary Examiner* — Dmitry H Levitan
(74) *Attorney, Agent, or Firm* — Lowe Hauptman & Ham, LLP

(57) ABSTRACT

A method for estimating a location of a mobile device located in means of transportation is provided. The method includes: developing a first database by linking ID information of the means of transportation with ID information of an access point (AP) installed in the means of transportation, the AP being a mobile AP allowing access to a wireless WAN through WiFi; developing a second database by linking ID information of the means of transportation with service information of the means of transportation, the service information including route and timetable information; acquiring WiFi reception information generated by the mobile device equipped with a WiFi module, the WiFi reception information including ID information of an AP transmitting a WiFi signal; extracting the ID information of the means of transportation in which the mobile device is located using the acquired WiFi reception information and the first database; and estimating a location of the mobile device using the extracted ID information of the means of transportation and the second database.

10 Claims, 17 Drawing Sheets

| WiFi fingerprint | F 0001 |
|---|---|
| AP ID information | received signal strength |
| 00-1E-68-A5-01-45 | -95 dBm |
| 00-1E-68-A5-01-46 | -75 dBm |
| 00-2A-23-12-A5-12 | -69 dBm |
| . | . |
| . | . |
| . | . |

FIG. 4

| ID information of means of transportation | ID information of mobile AP |
|---|---|
| T4001 | 00-1E-68-A5-01-45<br>00-1E-68-A5-01-46 |
| T4002 | 00-1E-66-B6-67-35<br>00-1E-66-B6-67-36 |
| T4003 | 00-16-50-01-42-A1<br>00-16-50-01-42-A2 |

(A)

| ID information of means of transportation | route information | timetable information |
|---|---|---|
| T4001 | danggogae<br>no won<br>chang dong<br>mia<br>dongdaemun<br>seoul station<br>.<br>.<br>. | 08:00  08:06<br>08:10  08:11<br>08:16  08:17<br>08:21  08:22<br>08:25  08:26<br>08:30  08:31<br>.<br>.<br>. |
| T4002 | .<br>.<br>. | .<br>.<br>. |
| T4003 | .<br>.<br>. | .<br>.<br>. |

(B)

| ID information of stop station | ID information of stationary AP |
|---|---|
| S4001 | 00-1E-68-A5-01-83<br>00-1E-68-A5-01-84 |
| S4002 | 00-1E-66-B6-67-47<br>00-1E-66-B6-67-48 |
| S4003 | 00-16-50-01-42-B1<br>00-16-50-01-42-B2 |

| WiFi fingerprint | F 0001 |
|---|---|
| AP ID information | received signal strength |
| 00-1E-68-A5-01-45<br>00-1E-68-A5-01-46<br>00-2A-23-12-A5-12<br>.<br>.<br>. | -95 dBm<br>-75 dBm<br>-69 dBm<br>.<br>.<br>. |

FIG. 12
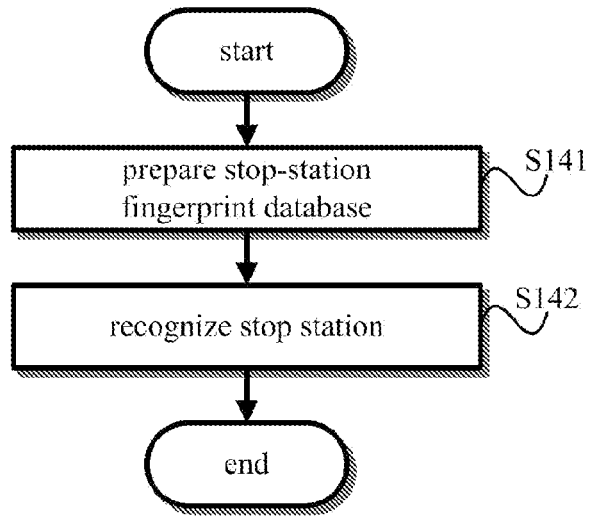
(A)
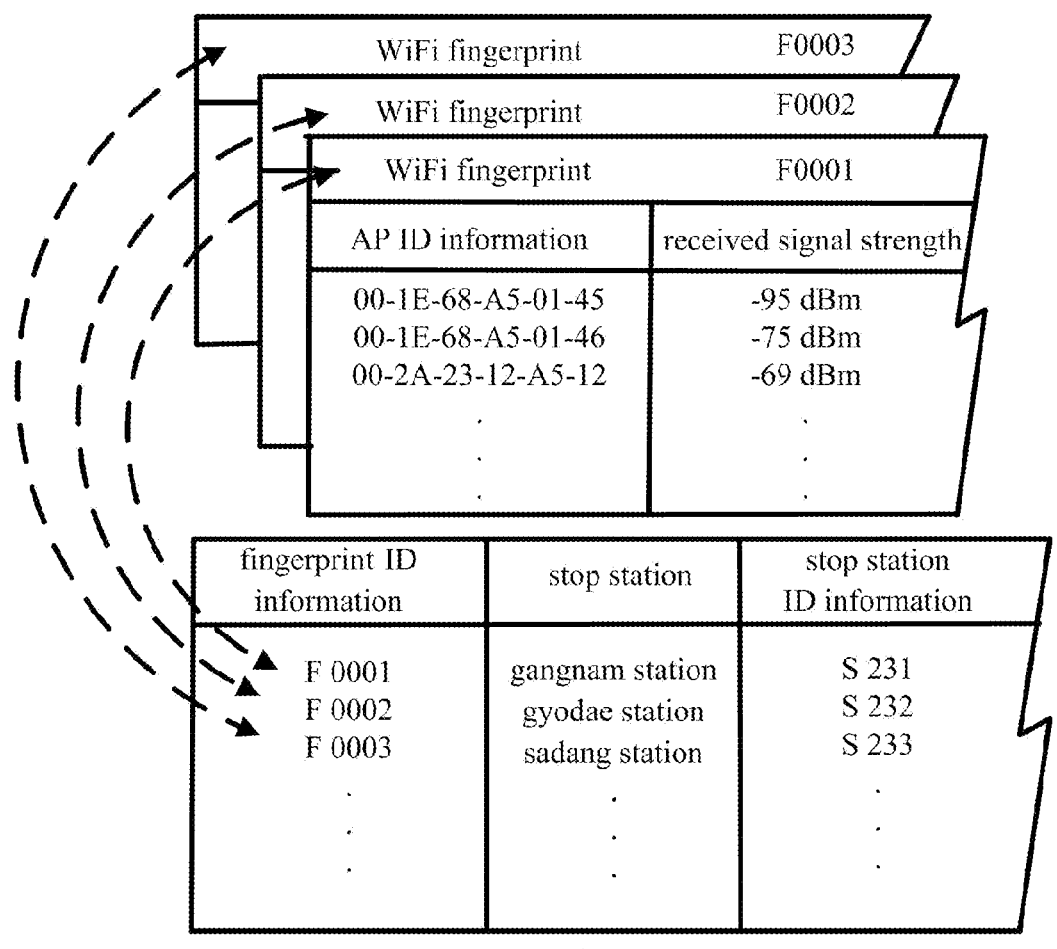
(B)

METHOD OF ESTIMATING LOCATION OF MOBILE DEVICE IN TRANSPORTATION USING WIFI

CROSS REFERENCE TO RELATED APPLICATION

This application claims the benefit under 35 U.S.C. §119(a) of Korean Patent Application No. 10-2011-0000978, filed on Jan. 5, 2011, and Korean Patent Application No. 10-2011-0015899, filed on Feb. 23, 2011, the disclosure of which is incorporated by reference in its entirety for all purposes.

BACKGROUND

1. Field

The following description relates to a method and system for estimating a location of a mobile device, and more particularly, to a method and system for estimating a location of a mobile device located in means of transportation through WiFi and a method of updating a database used in the location estimation.

2. Description of the Related Art

Recently, a variety of location-based services (LBS) are provided. The LBS is a service which makes business more productive and makes life more convenient based on location information. As smart phones are widely released to the public, the LBS is increasingly popular.

In association with a geographic information system (GIS), the LBS is widely used in a variety of industrial applications, such as transportation, distribution or disaster management. The LBS may be used in public transportation arrival announcement, navigation, chauffeur call, taxi call, and quick delivery. The LBS also includes find-pals services, stop station announcement services, shopping district advertising services, augmented reality services and social network services.

For the LBS, it is essential to easily and accurately acquire location information. In order to acquire location information, global positioning system (GPS) satellites or base stations for cellular phones have typically been used. While the GPS satellites are widely used to easily and accurately acquire location information, they exhibit serious weaknesses in some applications.

For example, in order to find a location of a mobile device located in a subway train, base stations for cellular phones are currently used for location estimation since GPS satellite signals fail to reach underground regions. For buses or trains running on the ground, the chances are high that mobile devices located in the buses or trains fail to receive GPS satellite signals due to their roofs. Besides, it takes a high operation performance and a long time to calculate location information using the GPS satellite signals. While base stations for cellular phones are used for such applications, this method exhibits a very low accuracy in location estimation.

Methods of easily and accurately acquiring location information of mobile devices located in such means of transportation as buses, subways, trains, ships and aircrafts have not been proposed. Besides, it is difficult to find a location of a mobile device located in means of transportation in motion. For such means of transportation as a ship or an aircraft which moves out of the coverage area of a base station for cellular phones, the method of using base station signals for cellular phones cannot be used in acquiring location information.

SUMMARY

The following description relates to a method of acquiring location information of a mobile device located in means of transportation.

Further, the following description relates to a method of easily and accurately acquiring location information of a mobile device without using GPS satellite signals or base station signals for cellular phones.

In addition, the following description relates to a method of easily and accurately acquiring location information of a mobile device located in a ship or an aircraft.

Accordingly, in one general aspect, there is provided a method for estimating a location of a mobile device located in means of transportation, the method including: developing a first database by linking identification (ID) information of the means of transportation with ID information of an access point (AP) installed in the means of transportation, the AP being a mobile AP which allows access to a wireless wide area network (WAN) through WiFi; developing a second database by linking ID information of the means of transportation with service information of the means of transportation, the service information including route information and timetable information; acquiring WiFi reception information generated by the mobile device equipped with a WiFi module, the WiFi reception information including ID information of an AP transmitting a WiFi signal; extracting the ID information of the means of transportation in which the mobile device is located using the acquired WiFi reception information and the first database; and estimating a location of the mobile device using the extracted ID information of the means of transportation and the second database.

In another general aspect, there is provided a method for estimating a location of a mobile device located in means of transportation, the method including: developing a first database by linking identification (ID) information of the means of transportation with ID information of an access point (AP) installed in the means of transportation, the AP being a mobile AP which allows access to a wireless wide area network (WAN) through WiFi; developing a second database by linking ID information of the means of transportation with service information of the means of transportation, the service information including route information and timetable information; developing a third database by linking ID information of a stop station of the means of transportation with ID information of an AP installed at the stop station, the AP being a stationary AP which allows access to a wired/wireless network through WiFi; acquiring WiFi reception information generated by the mobile device equipped with a WiFi module, the WiFi reception information including ID information of an AP transmitting a WiFi signal; extracting the ID information of the means of transportation in which the mobile device is located using the acquired WiFi reception information and the first database; extracting the ID information of the stop station of the means of transportation in which the mobile device is located using the acquired WiFi reception information and the third database; and estimating a location of the mobile device using the extracted ID information of the means of transportation, the extracted ID information of the stop station, and the second database.

According to still another aspect, there is provided a method for estimating a location of a mobile device located in means of transportation, the method including: developing a first database by linking identification (ID) information of the means of transportation with ID information of an access point (AP) installed in the means of transportation, the AP being a mobile AP which allows access to a wireless wide area network (WAN) through WiFi; acquiring WiFi reception information generated by the mobile device equipped with a WiFi module, the WiFi reception information including ID information of an AP transmitting a WiFi signal; extracting the ID information of the means of transportation in which the mobile device is located using the acquired WiFi reception information and the first database; and retrieving real-time location information of the means of transportation having the extracted ID information and estimating the real-time location information of the means of transportation as a location of the mobile device.

According to yet another aspect, there is provided a method for estimating a location of a mobile device located in means of transportation, the method including: developing a first database by linking identification (ID) information of the means of transportation with ID information of an access point (AP) installed in the means of transportation, the AP being a mobile AP which allows access to a wireless wide area network (WAN) through WiFi; developing and updating a fourth database by linking ID information of the means of transportation with real-time location information of the means of transportation; receiving WiFi reception information acquired by a mobile device equipped with a WiFi module, the WiFi reception information including ID information of an AP transmitting a WiFi signal; extracting the ID information of the means of transportation in which the mobile device is located using the acquired WiFi reception information and the first database; and retrieving real-time location information of the means of transportation having the extracted ID information using the fourth database and estimating the real-time location information of the means of transportation as a location of the mobile device.

According to yet another aspect, there is provided a method of estimating a location of a mobile device using a WiFi signal, the method including: preparing a stop-station fingerprint database by linking a WiFi fingerprint at each stop station on a route of means of transportation (hereinafter referred to as 'stop-station WiFi fingerprint') with identification (ID) information of each corresponding stop station, the WiFi fingerprint including at least one pair of ID information and received signal strength of access point (AP) included in a received WiFi signal; and recognizing a stop station by comparing a WiFi fingerprint acquired by a mobile device located in the means of transportation (hereinafter referred to as 'acquired WiFi fingerprint') with the stop-station WiFi fingerprint in the stop-station fingerprint database.

According to yet another aspect, there is provided a method of estimating a location of a mobile device using a WiFi signal in a location-based service system, the method including: preparing a transportation service database including route information of means of transportation, the route information including information on each stop station on the route; preparing a stop-station fingerprint database by linking a WiFi fingerprint at each stop station on the route (hereinafter referred to as 'stop-station WiFi fingerprint') with identification (ID) information of each corresponding stop station, the WiFi fingerprint including at least one pair of ID information and received signal strength of access point (AP) included in a received WiFi signal; sequentially recognizing two or more stop stations which the means of transportation in motion approaches by repeatedly comparing a WiFi fingerprint acquired by a mobile device located in the means of transportation (hereinafter referred to as 'acquired WiFi fingerprint') with the stop-station WiFi fingerprint in the stop-station fingerprint database; and estimating a location of the means of transportation in motion based on the two or more stop stations and the route information in the means of transportation service database and recognizing the estimated location of the means of transportation as a location of the mobile device.

According to yet another aspect, there is provided a method of estimating a location of a mobile device using a WiFi signal in a location-based service system, the method including: preparing a stop-station fingerprint database by linking a WiFi fingerprint at each stop station on a route of means of transportation (hereinafter referred to as 'stop-station WiFi fingerprint') with identification (ID) information of each corresponding stop station, the WiFi fingerprint including at least one pair of ID information and received signal strength of access point (AP) included in a received WiFi signal; receiving a WiFi fingerprint acquired by a mobile device located in the means of transportation (hereinafter referred to as 'acquired WiFi fingerprint'); recognizing a stop station by comparing the acquired WiFi fingerprint with the stop-station WiFi fingerprint in the stop-station fingerprint database; providing a location-based application service based on the recognized stop station; and updating the stop-station fingerprint database using the acquired WiFi fingerprint.

According to yet another aspect, there is provided a method of updating a location estimation database in a location-based service system managing the location estimation database which is developed by linking a WiFi fingerprint at a point of interest which is a reference point in estimating a location of a mobile device (hereinafter referred to as 'reference WiFi fingerprint') with identification (ID) information of the point of interest, wherein the WiFi fingerprint includes at least one pair of ID information and received signal strength of access point (AP) included in a received WiFi signal, the method including: receiving a WiFi fingerprint acquired by a mobile device of a user using a location-based service (hereinafter referred to as 'acquired WiFi fingerprint'); comparing the acquired WiFi fingerprint with the location estimation database and determining if the mobile device is located at one of points of interest included in the location estimation database; and if the mobile device is determined to be located at one of the points of interest, updating the reference WiFi fingerprint associated with the determined point of interest using the acquired WiFi fingerprint.

According to yet another aspect, there is provided a method of updating a location estimation database in a location-based service system managing the location estimation database which is developed by linking a WiFi fingerprint at a point of interest which is a reference point in determining a location of a mobile device (hereinafter referred to as 'reference WiFi fingerprint') with identification (ID) information of the point of interest, wherein the WiFi fingerprint includes at least one pair of ID information and received signal strength of access point (AP) included in a received WiFi signal, the method including: receiving a WiFi fingerprint acquired by a mobile device of a user using a location-based service (hereinafter referred to as 'acquired WiFi fingerprint'); comparing the acquired WiFi fingerprint with the reference WiFi fingerprint of the location estimation database and determining if the mobile device is located at one of points of interest included in the location estimation database; and if the mobile device is determined to be located at one of the points of interest, updating a primitive WiFi fingerprint associated with the determined point of interest and the reference WiFi fingerprint using the acquired WiFi fingerprint, wherein the primitive WiFi fingerprint includes a plurality of pairs of ID information and received signal strength of all APs which can be received at a point of interest, and the reference WiFi fingerprint is a subset of the primitive WiFi fingerprint selected from among the ID information and received signal strength of APs of the primitive WiFi fingerprint.

According to yet another aspect, there is provided a method of updating a location estimation database in a location-based service system managing the location estimation database which is a reference in determining a location of a mobile device and is developed by linking identification (ID) information of a point of interest with a set of ID information of access point (AP) transmitting a WiFi signal which can be received at the point of interest (hereinafter referred to as 'reference AP set'), the method including: receiving a set of AP identification information extracted from a WiFi signal received by a mobile device of a user using a location-based service (hereinafter referred to as 'received AP set'); comparing the received AP set with the location estimation database and determining if the mobile device is located at one of points of interest included in the location estimation database; and if the mobile device is determined to be located at one of the points of interest included in the location estimation database, updating the reference AP set associated with the determined point of interest using the received AP set.

According to yet another aspect, there is provided a method of updating a location estimation database in a location-based service system managing the location estimation database which is a reference in determining a location of a mobile device and is developed by linking identification (ID) information of a point of interest with a set of ID information of access point (AP) transmitting a WiFi signal which can be received at the point of interest (hereinafter referred to as 'reference AP set'), the method including: receiving an AP set acquired by a mobile device of a user using a location-based service (hereinafter referred to as 'received AP set'); comparing the received AP set with the reference AP set of the location estimation database and determining if the mobile device is located at one of points of interest included in the location estimation database; and if the mobile device is determined to be located at one of the points of interest included in the location estimation database, updating a primitive AP set and the reference AP set, which are associated with the determined point of interest, using the received AP set, wherein the primitive AP set is an AP set including all APs which can be received at a point of interest and the reference AP set is a subset of the primitive AP set selected from among the APs of the primitive AP set.

Other features will become apparent to those skilled in the art from the following detailed description, which, taken in conjunction with the attached drawings, discloses exemplary embodiments of the invention.

BRIEF DESCRIPTION OF THE DRAWINGS

FIGS. 4A to 4C illustrate first to third databases, respectively, used in a location estimation method according to an exemplary embodiment of the present invention.

FIG. 10 illustrates an example of a WiFi fingerprint.

FIG. 12A is a flowchart illustrating a location estimation method according to a third embodiment of the present invention; FIG. 12B illustrates an example of a stop-station fingerprint database.

Elements, features, and structures are denoted by the same reference numerals throughout the drawings and the detailed description, and the size and proportions of some elements may be exaggerated in the drawings for clarity and convenience.

DETAILED DESCRIPTION

Figure 1:
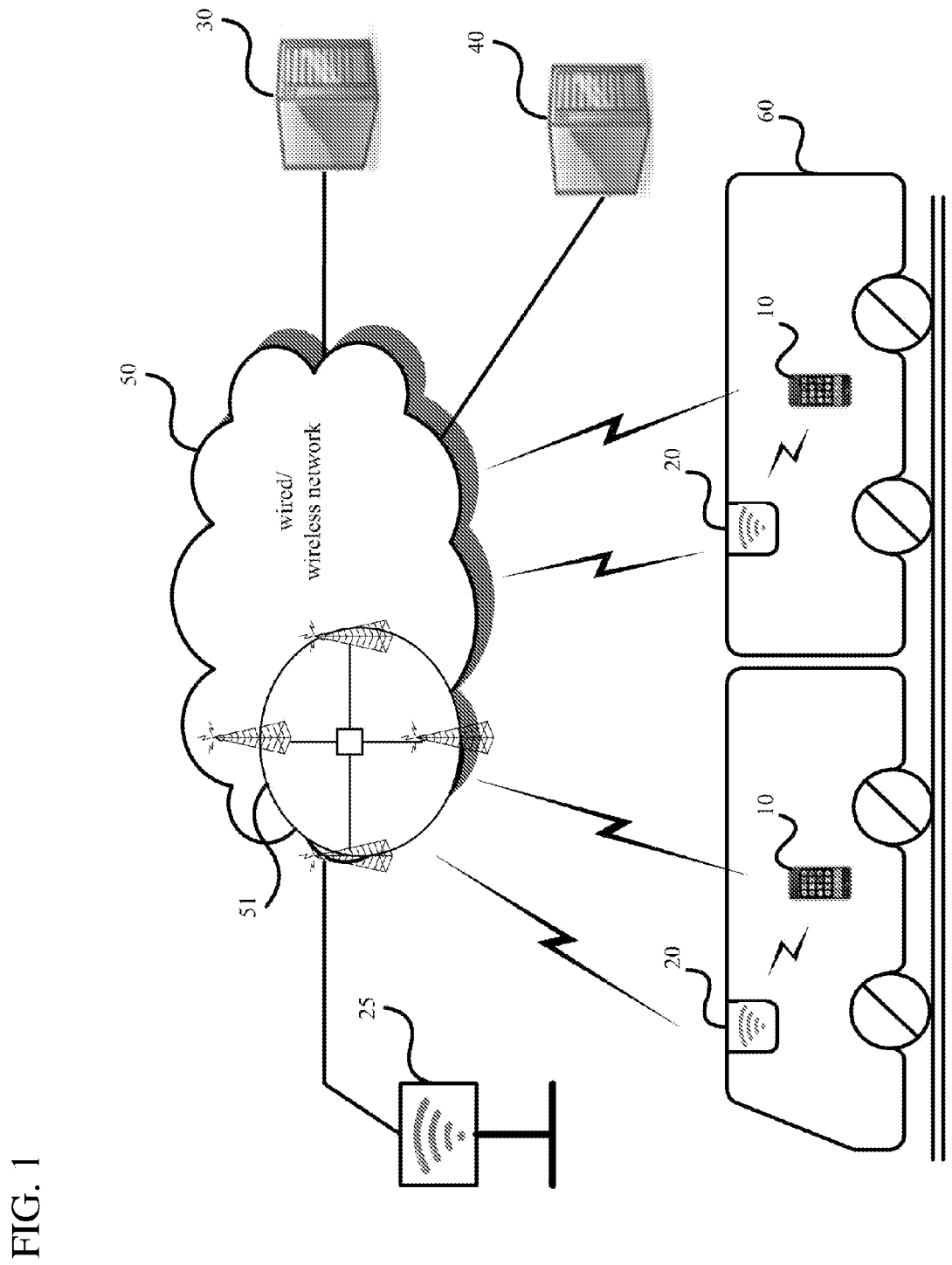
FIG. 1 is a schematic diagram illustrating how to apply a method of estimating a location of a mobile device within means of transportation in accordance with an exemplary embodiment of the present invention.

The following detailed description is provided to assist the reader in gaining a comprehensive understanding of the methods, apparatuses and/or systems described herein. Such a description is for illustrative purposes only and not for purposes of limiting the same. Descriptions of well-known functions and structures are omitted to enhance clarity and conciseness. In addition, like elements are denoted by like reference numerals throughout the specification and drawings. Various changes, modifications, and equivalents of the systems, apparatuses and/or methods described herein will suggest themselves to those of ordinary skill in the art.

1. Application of Location Estimation Method and Location Estimation System (1)

FIG. 1 is a schematic diagram illustrating how to apply a method of estimating a location of a mobile device within means of transportation in accordance with an exemplary embodiment of the present invention.

Means of transportation 60 refers to any vehicle, such as bus, subway, train, ship or aircraft, that you can travel in or carry goods in. The means of transportation 60 may run along a predetermined service route according to a service timetable. Means of transportation 60 has identification (ID) information to identify itself. For example, a bus may have a plate number, such as 'Seoul 30 Do 1843', as ID information; a subway may have a subway line number, such as 'T4001', as ID information; an aircraft may have an aircraft registration number, such as 'K193AA', as ID information. For such means of transportation consisting of a plurality of coupled passenger cars as subway or train, each passenger car may be assigned ID information, or the means of transportation may be assigned ID information. The means of transportation 60 may stop at each stop station on a predetermined service route of the means of transportation 60.

The means of transportation 60 is equipped with an access point (AP) 20 which is a mobile AP that allows access to a wireless wide area network (WAN) 51 through WiFi. The AP 20 is designed to communicate with a mobile device 10 within the means of transportation 60 through WiFi. The AP 20 serves as an access point of the mobile device 10 to the wireless WAN 51.

On the other hand, an AP 25 is also installed at each stop station. The AP 25 is a stationary AP that allows access to a wired/wireless network 50 through WiFi. The AP 25 is designed to communicate with a mobile device (not shown) located at the stop station or with the mobile device 10 within the means of transportation 60 through WiFi. The AP 25 serves as an access point of the mobile device to the wired/wireless network 50.

The mobile device 10 is a portable device equipped with a WiFi module. Examples of the mobile device 10 may include notebook, PDA, smart phone, notepad, and WiFi tag each equipped with a WiFi module. The mobile device 10 may communicate with the AP 20 or 25 through WiFi or directly access to the wireless WAN 51. The mobile device 10 generates WiFi signal information received from the AP 20 or 25. The received WiFi signal information includes ID information of the AP 20 or 25 transmitting a WiFi signal. For example, the received WiFi signal information may be a WiFi fingerprint which includes ID information of the AP 20 or 25, which can be received by the mobile device 10 based on its current location, and signal strength of the AP 20 or 25. That is, the WiFi fingerprint is comprised of a set of the ID information and received signal strength of the AP 20 or 25. The wired/wireless network 50 refers to a communication network for wide area communications and includes the wireless WAN 51.

A location server 40 is a system for estimating a location of the mobile device 10 located in the means of transportation 60 according to an exemplary embodiment of the present invention. Alternatively, an application server 30 or the mobile device 10 may incorporate a part or whole of functions of the location server 40. The location server 40 is designed to communicate with the mobile device 10, the application server 30, and a means of public transportation management system (not shown) over the wired/wireless network 50. The location server 40 generally estimates the location of the mobile device 10 at the request of the mobile device 10 or the application server 30 and provides the estimated location for the mobile device 10 or the application server 30. Information required for the location estimation may be provided by the mobile device 10, the application server 40 or the means of public transportation management system (not shown) and may be obtained from a developed database.

The application server 30 refers to a system for providing location-based application services for the mobile device 10. Examples of the location-based application services may include means of public transportation arrival time service, navigation service, chauffeur call service, taxi call service, quick-delivery service, find-pals service, stop station announcement service, shopping district advertising service, augmented reality service and social network service. The application server 30 requests location information of the mobile device 10 from the location server 40 for location-based application services, receives the location information, and provides the location-based application services based on the received location information. In one embodiment, the application server 30 and the location server 40 may be incorporated into a single entity.

Figure 2:
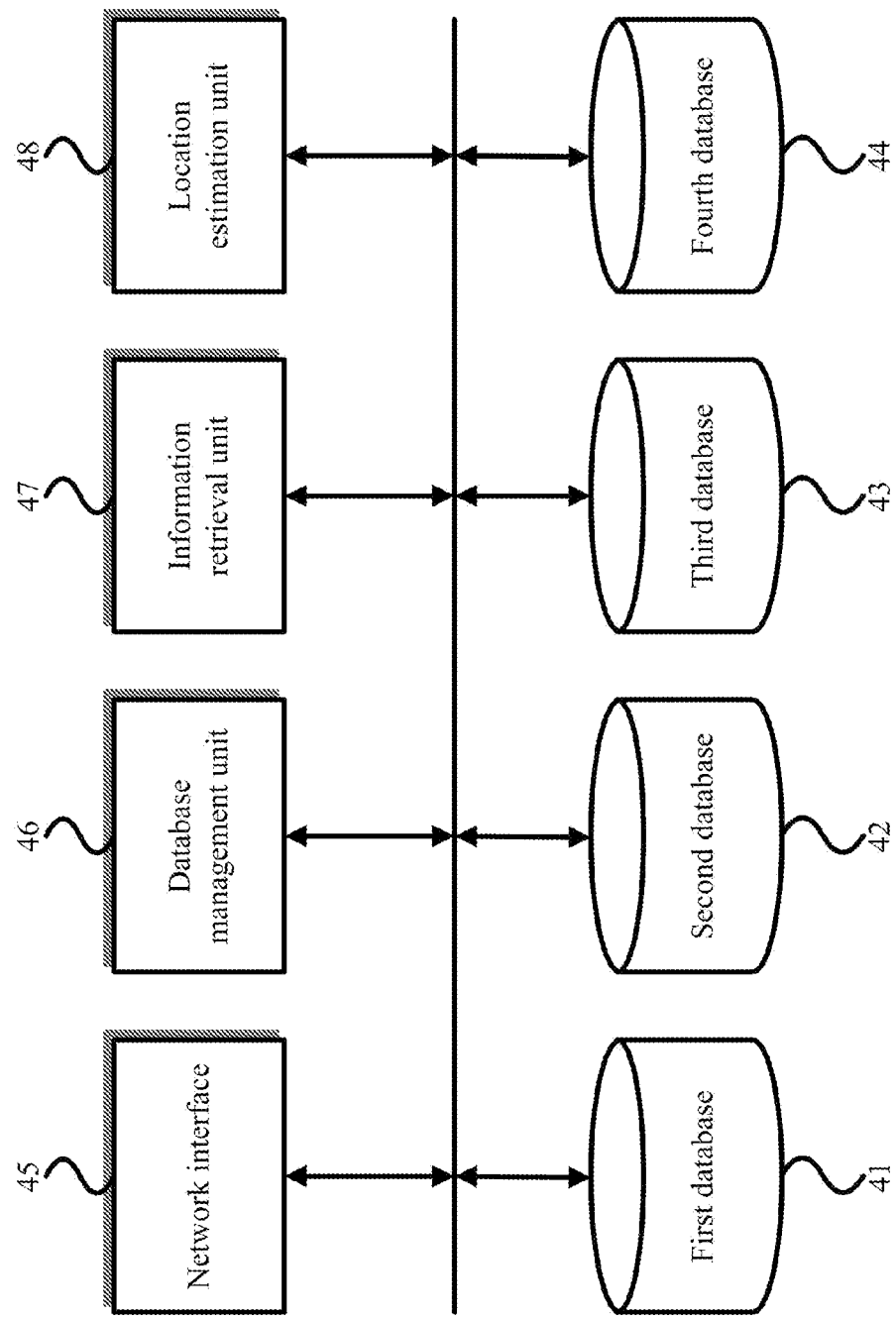
FIG. 2 is a block diagram illustrating a location server according to an exemplary embodiment of the present invention.

FIG. 2 is a block diagram illustrating the location server 40 according to an exemplary embodiment of the present invention.

The location server 40 uses first to fourth databases 41-44 which will be described in detail.

A network interface 45 is a functional block used in interfacing with the wired/wireless network 50. The location server 40 communicates with the application server 30, the mobile device 10, etc. through the network interface 45. A database management unit 46 is a functional block used in developing and managing the first to fourth databases 41-44.

An information retrieval unit 47 is a functional block used to retrieve and extract information from internal or external databases. A location estimation unit 48 is responsible for estimating a location of the mobile device 10 located in the means of transportation 60 using the information retrieval unit 47 and the first to fourth databases 41-44.

The location server 40 equipped with these functional blocks will be described in detail.

2. Location Estimation Method: First Embodiment

A location estimation method according to the first embodiment of the present invention may be divided into the following two processes: a database developing process and a location estimating process.

Figure 3:
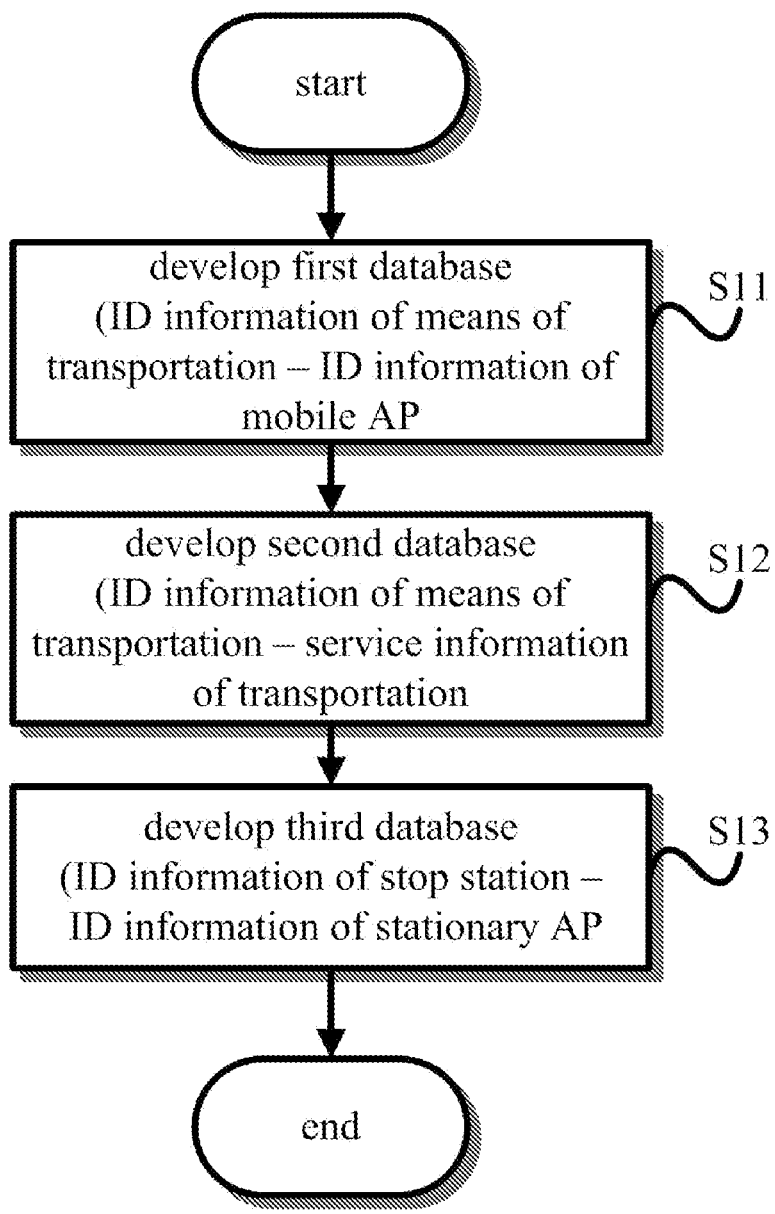
FIG. 3 is a flowchart illustrating a database developing process in a location estimation method according to a first embodiment of the present invention.

FIG. 3 is a flowchart illustrating the database developing process in the location estimation method according to the first embodiment of the present invention.

The database developing process may include first database developing operation S11, second database developing operation S12 and third database developing operation S13. The three operations may be performed simultaneously or in an order different from this order. Some of the three operations may be omitted.

In the first database developing operation S11, a first database is developed by linking ID information of the means of transportation 60 with ID information of the AP 20 located in the means of transportation 60. The AP 20 is a mobile AP which allows access to the wireless WAN 51 through WiFi.

FIGS. 4A to 4C illustrate first to third databases, respectively, used in a location estimation method according to an exemplary embodiment of the present invention.

FIG. 4A illustrates 'T4001', 'T4002' and 'T4003' as exemplary ID information of the means of transportation 60. Means of transportation 60 with an ID information of 'T4001' is equipped with two APs 20 with ID information of '00-1E-68-A5-01-45' and '00-1E-68-A5-01-46'.

The ID information of the AP 20 and 25, which are installed in the means of transportation 60 and at the stop station, respectively, may be MAC address or SSID of the APs 20 and 25 or may comply with a different standard identification system. For the ID information of the APs 20 and 25, any information to uniquely identify the APs through the location estimation system will be sufficient. FIG. 4A illustrates MAC address, for example.

In the second database developing process S12, a second database is developed by linking ID information of the means of transportation 60 with transportation service information of the means of transportation 60. The transportation service information includes route information and timetable information of the means of transportation 60. The route information refers to information on the route of the means of transportation 60, and the timetable information refers to information on the schedule of the means of transportation 60. Accordingly, if a current time is known, a current location of the means of transportation 60 may be estimated from the transportation service information.

FIG. 4B illustrates the second database. The subway 'T4001' has route information which is a set of stop stations on the route where the subway runs, and timetable information which is a set of arrival and departure times of the means of transportation at each stop station. The route information may be determined in such a way as a set of stop stations or a set of absolute coordinates of a plurality of stop stations on the route of the means of transportation.

In the third database developing process S13, a third database is developed by linking ID information of each stop station of the means of transportation 60 with ID information of the AP 25 installed at each stop station. The AP 25 is a stationary AP which allows access to the wired/wireless network 50 through WiFi.

FIG. 4C illustrates 'S4001', 'S4002' and 'S4003' as examples of the ID information of each stop station. For example, the stop station 'S4001' has two APs 25 with ID information of '00-1E-68-A5-01-83' and '00-1E-68-A5-01-84', respectively.

Figure 5:
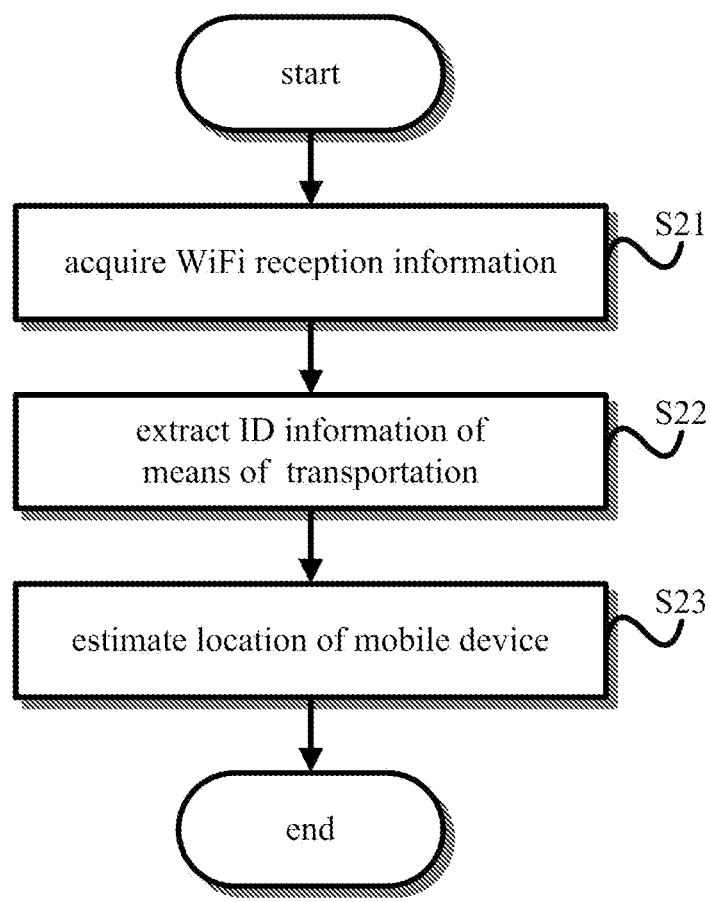
FIG. 5 is a flowchart illustrating a location estimating process in a location estimation method according to a first embodiment of the present invention.

FIG. 5 is a flowchart illustrating a location estimating process in the location estimation method according to the first exemplary embodiment of the present invention.

In operation S21, WiFi reception information generated by the mobile device 10 equipped with a WiFi module is acquired. The WiFi reception information includes ID information of the AP 20 transmitting a WiFi signal. That is, the WiFi reception information includes ID information of the AP 20 installed in the means of transportation 60 and ID information of the AP 25 installed at the stop station. The ID information of the AP 25 will not be used in the following operations in the present embodiment. The WiFi reception information is a WiFi fingerprint, for example. The WiFi fingerprint is comprised of a set of ID information of the AP 20, which can be received by the mobile device 10 based on its current location, and signal strength of a signal transmitted by the AP 20. The WiFi reception information is directly or indirectly received from the mobile device 10. For example, the location server 40 may receive the WiFi reception information, together with the application server's request for location estimation.

In operation S22, ID information of the means of transportation 60 where the mobile device 10 is located is extracted using the WiFi reception information and the first database. The first database is developed by liking the ID information of the means of transportation 60 with the ID information of the AP 20 installed in the means of transportation 60.

Specifically, in operation S22, the ID information of the AP 20 included in the WiFi reception information is recognized and the ID information of the means of transportation 60 associated with the recognized ID information of the AP 20 is extracted from the first database. Alternatively, the ID information of the AP 20 generating the greatest of received signal strengths included in the WiFi reception information is recognized. That is, in addition to the ID information of the AP 20 included in the WiFi reception information, the received signal strength of the WiFi signal transmitted by the AP 20 may be used. The ID information of the means of transportation 60 associated with the recognized ID information of the AP 20 is extracted from the first database. Accordingly, the ID information of the means of transportation 60 where the mobile device 10 is located may be extracted. In the present embodiment, the ID information of the means of transportation 60 is first determined.

In operation S23, the location of the mobile device 10 is estimated using the extracted ID information of the means of transportation 60 and the second database. The second database is developed by linking the ID information of the means of transportation 60 with the transportation service information of the means of transportation 60.

Specifically, in operation S23, the location of the mobile device 10 is estimated by extracting the route information and timetable information of the means of transportation 60, which are associated with the extracted ID information of the means of transportation 60, from the second database and associating the extracted route information and timetable information with time information. The time information is the time when the mobile device 10 generates the WiFi reception information. However, the time information may be approximated to the time when the location server 40 performs location estimation.

Location estimation results may be represented in such a way as identifiers, characters, absolute coordinates, or coordinates on a specific map to indicate the locations.

After the location estimation of the mobile device 10 is completed, the location server 40 transmits the estimation result to the application server 30 or the mobile device 10 so that the estimation result may be used for location-based application services.

In the present embodiment of the present invention, it should be noted that the first database, which is developed by linking the ID information of the AP 20 with the ID information of the means of transportation, and the second database, which is developed by linking the ID information of the means of transportation with the service information of the means of transportation, are used in performing the location estimation.

According to the present embodiment, it is possible to easily and accurately acquire the location information of the mobile device which is located in the means of transportation in motion.

Further, it is possible to easily and accurately acquire the location information of the mobile device located in the means of transportation in motion without using GPS signals or base station information for cellular phones.

Further, it is possible to easily and accurately acquire the location information of the mobile device located in the means of transportation which has a roof or runs through an area where GPS signals will not be received.

Further, the AP installed in the means of transportation can be used for the location estimation without modifying or altering the AP.

Further, it is possible to make an accurate location estimation so long as the service information of the means of transportation is accurately updated. In particular, the present invention is very useful for the location estimation if the means of transportation actually runs in compliance with the scheduled service information.

Further, it is possible to easily and accurately estimate the location of the mobile device located in such means of transportation as ship or aircraft which runs through areas where base station signals for cellular phones will not be received.

Figure 6:
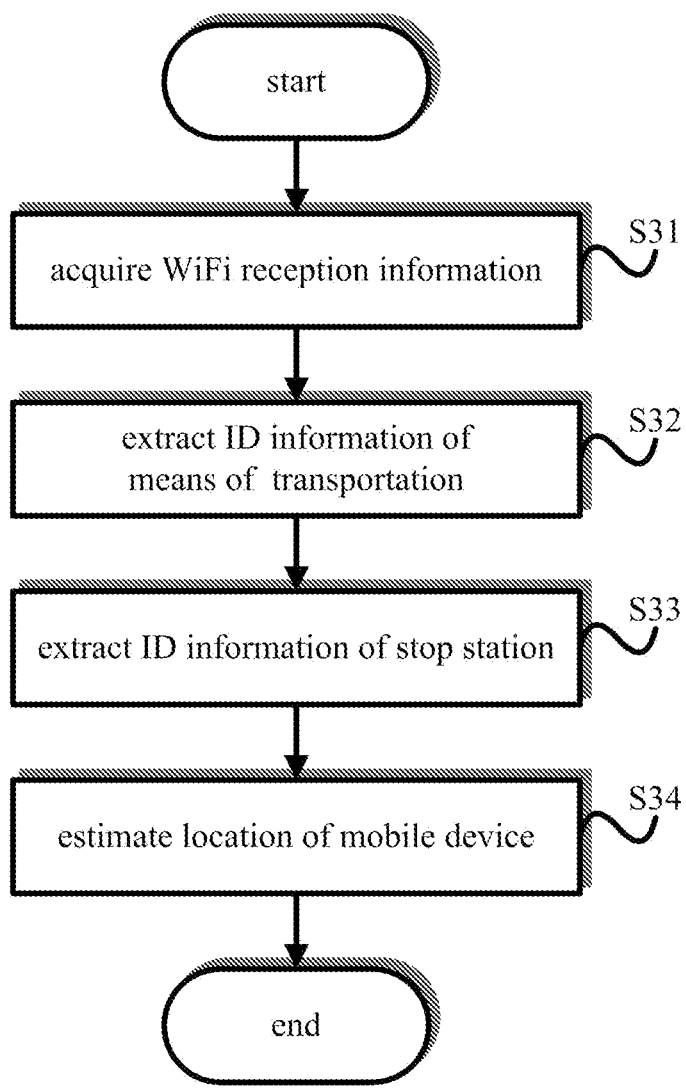
FIG. 6 is a flowchart illustrating another location estimating process in a location estimation method according to a first embodiment of the present invention.

FIG. 6 is a flowchart illustrating another location estimating process in the location estimation method according to the first embodiment of the present invention.

In operation S31, WiFi reception information generated by the mobile device 10 equipped with the WiFi module is acquired. The WiFi reception information includes ID information of the AP 20 or 25 transmitting a WiFi signal. That is, it includes the ID information of the AP 20 installed in the means of transportation 60 and the ID information of the AP 25 installed at the stop station.

For example, the WiFi reception information is a WiFi fingerprint. The WiFi fingerprint is comprised of a set of ID information of the APs 20 and 25, which can be received by the mobile device 10 based on its current location, and signal strengths of signals transmitted by the APs 20 and 25. The WiFi reception information is directly or indirectly received from the mobile device 10. For example, the location server 40 may receive the WiFi reception information, together with the application server's request for the location estimation.

In operation S32, ID information of the means of transportation 60 where the mobile device 10 is located is extracted using the WiFi reception information and the first database.

Specifically, the ID information of the AP 20 included in the WiFi reception information is recognized and the ID information of the means of transportation 60 associated with the recognized ID information of the AP 20 is extracted from the first database.

Alternatively, the ID information of the AP 20 generating the greatest of received signal strengths included in the WiFi reception information is recognized. That is, in addition to the ID information of the AP 20 included in the WiFi reception information, the received signal strength of the WiFi signal transmitted by the AP 20 may be used for the location estimation. The ID information of the means of transportation 60 associated with the recognized ID information of the AP 20 is extracted from the first database.

In operation S33, the ID information of each stop station of the means of transportation 60 where the mobile device 10 is located is extracted using the acquired WiFi reception information and the third database. The WiFi reception information may not include the AP 25 installed at the stop station depending upon the location of the means of transportation. However, when a plurality of mobile devices 10 and a long time are considered, the AP 25 installed at the stop station should be apparently included and will thus be used for the location estimation.

In order to extract the ID information of the stop station, the ID information of the AP 25 included in the WiFi reception information is recognized and the ID information of the stop station associated with the recognized ID information of the AP 25 is extracted from the third database. The AP 25 is a stationary AP installed at the stop station.

Alternatively, the ID information of the AP 25 generating the greatest of received signal strengths included in the WiFi reception information is recognized. That is, in addition to the ID information of the AP 25 included in the WiFi reception information, the received signal strength of the WiFi signal transmitted by the AP 25 may be used for the location estimation. The ID information of the stop station associated with the recognized ID information of the AP 25 is extracted from the first database.

In operation S34, the location of the mobile device 10 is estimated using the extracted ID information of the means of transportation 60, the extracted ID information of the stop station, and the second database.

Specifically, the route information and timetable information of the means of transportation associated with the extracted ID information of the means of transportation 60 are extracted from the second database. The second database is developed by linking the ID information of the means of transportation 60 with the route information and timetable information of the means of transportation 60.

The extracted timetable information is corrected using the extracted ID information of the stop station and the time information. The means of transportation 60 may or may not run in compliance with the predetermined timetable information. If the ID information of the AP 25 installed at the stop station is included in the WiFi reception information and the stop station is extracted in the operation S33, it is suggested that the means of transportation 60 is located within communication coverage area of the AP 25 installed at the stop station. Accordingly, since an actual location of the means of transportation 60 is estimated, the timetable information of the means of transportation 60 may be corrected.

The location of the mobile device 10 is estimated by associating the extracted route information and the corrected timetable information with time information. The time information is the time when the mobile device 10 generates the WiFi reception information. However, the time information may be approximated to the time when the location server 40 performs the location estimation. In the present embodiment of the present invention, it should be noted that the timetable information of the means of transportation is corrected using the information of the stop station acquired from the WiFi reception information. The more mobile devices located in the means of transportation, the more accurate correction of the timetable information may be performed. The location of the mobile device located in the means of transportation may be more accurately estimated using the corrected timetable information and the route information.

After the location estimation of the mobile device 10 is completed, the location server 40 transmits the location estimation result to the application server 30 or the mobile device 10 so that the location estimation result may be used for the location-based application services.

A method of automatically updating the third database, which is developed by linking the ID information of the stop station of the means of transportation 60 with the ID information of the AP 25 installed at the stop station, will be described in detail.

When the third database is initially developed, one or more APs 25 may have been installed at the stop station. After the initial development of the third database, another AP 25 may be added to the stop station. If a new AP 25 is installed at the stop station after the initial development of the third database, the WiFi reception information generated by the mobile device 10 which stops at the stop station afterwards may further include ID information of the new AP 25. That is, in addition to the ID information of the AP 25 already installed at the stop station and the AP 20 installed in the means of transportation 60, the ID information of the new AP 25 is provided. The new AP 25 may be determined to be newly installed at the stop station associated with the existing AP 25. It is assumed that a new AP 20 installed in the means of transportation 60 is immediately added to the first database.

Specifically, referring back to FIG. 6, the ID information of the AP 25, which is associated with the ID information of the stop station extracted in the operation S33, and the ID information of the AP 20, which is associated with the ID information of the means of transportation 60 extracted in the operation S32, are excluded from the ID information of the APs 20 and 25 included in the WiFi reception information acquired in the operation S31. The ID information of the remaining AP 25 is determined to be newly installed at the stop station and is added to the third database.

In the present embodiment of the present invention, it should be noted that the location estimation is performed using the first database which is developed by linking the ID information of the AP 20 with the ID information of the means of transportation, the second database which is developed by linking the ID information of the means of transportation with the service information of the means of transportation, and the third database which is developed by linking the ID information of the AP with the ID information of the stop station.

According to the present embodiment, it is possible to easily and accurately acquire the location information of the mobile device which is located in the means of transportation in motion.

Further, it is possible to easily and accurately acquire the location information of the mobile device located in the means of transportation in motion without using GPS signals or base station information for cellular phones.

Further, it is possible to easily and accurately acquire the location information of the mobile device located in the means of transportation which has a roof or runs through an area where GPS signals will not be received.

Further, the AP 20 installed in the means of transportation or the AP 25 installed at the stop station can be used for the location estimation without modifying or altering the AP 20 or 25.

Further, even though the predetermined service information of the means of transportation fails to match with the actual service of the means of transportation, it is possible to make an accurate location estimation of the mobile device located in the means of transportation by correcting the service information of the means of transportation.

Further, it is possible to easily and accurately estimate the location of the mobile device located in such means of transportation as ship or aircraft which runs through areas where base station signals for cellular phones will not be received.

Further, when a new AP 25 is installed at the stop station, the database can be automatically updated by adding the new AP 25 to the database.

3. Location Estimation Method: Second Embodiment

A location estimation method according to the second embodiment uses real-time location information of means of transportation 60, which is generated and managed by a public transportation management system. The public transportation management system is operated by such an entity as a government or a local government to efficiently operate means of public transportation or to provide information for passengers. The public transportation management system is responsible for generating and managing real-time location information of the means of transportation 60. The public management system acquires and provides the real-time location information of the means of transportation 60 in a variety of ways. Hereinafter, a typical way of acquiring and providing the real-time location information of the means of transportation will be described.

Figure 7:
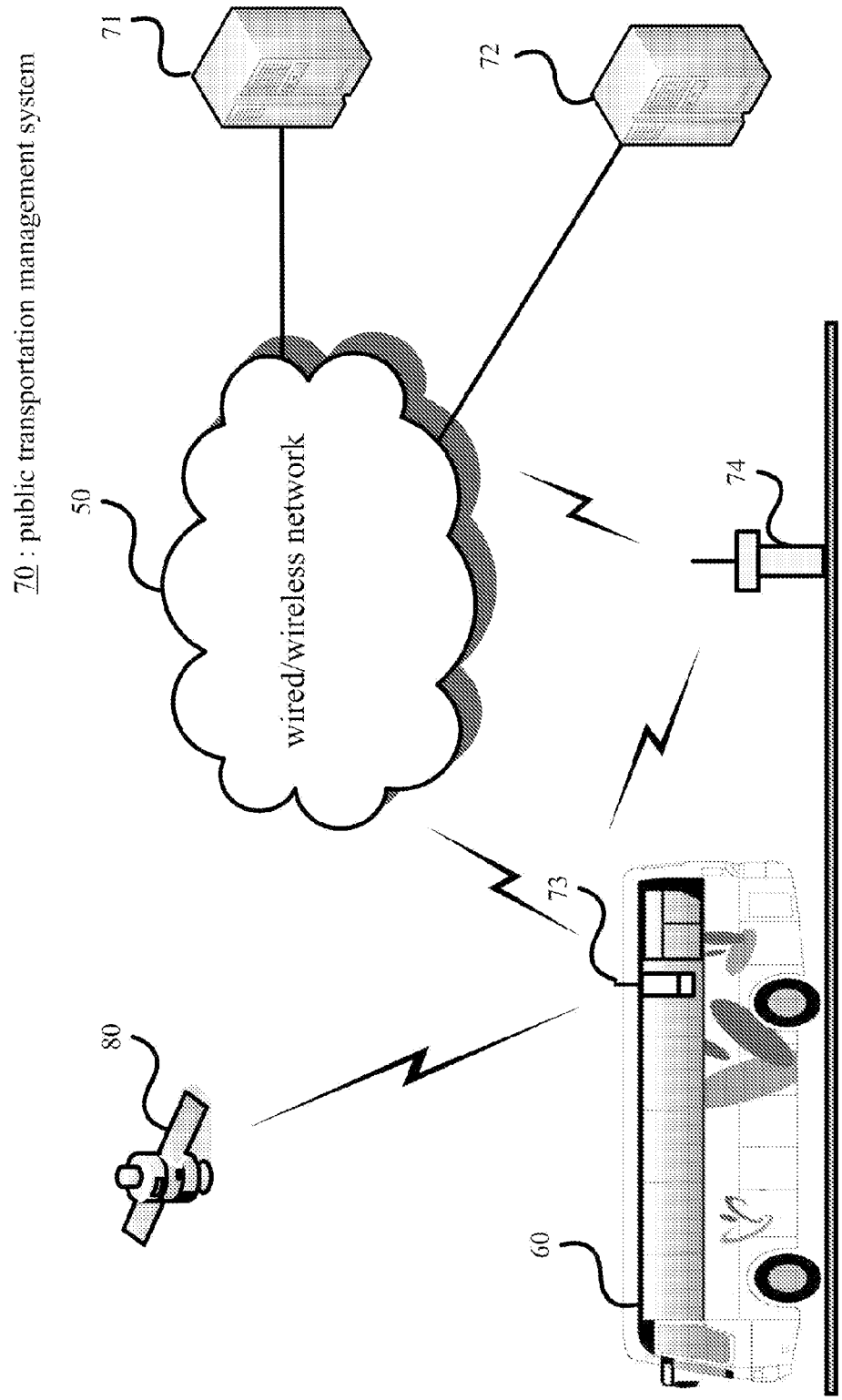
FIG. 7 is a schematic diagram illustrating a means of public transportation management system used in a second embodiment of the present invention.

FIG. 7 is a schematic diagram illustrating a public transportation management system which is used in the second embodiment of the present invention.

A public transportation management system 70 may include a control center 71, a real-time traffic information service system 72, a terminal 73, and a beacon 74. The terminal 73 is installed in the means of transportation 60 to receive a GPS signal from a GPS satellite 80 or receive a beacon signal from the beacon 74. The GPS signal or beacon signal is transmitted to the control center 71 over the wired/wireless network 50. The control center 71 controls the operation of the means of transportation 60 by calculating and using real-time location information of each means of transportation 60 using the GPS or beacon signal.

The control center 71 provides the real-time location information of the means of transportation 60 for the real-time traffic information service system 72 so that the real-time location information may be provided to passengers. The control center 71 and the real-time traffic information service system 72 may be incorporated into one entity. If the control center 71 is unnecessary, only the real-time traffic information service system 72 may be operated.

In the present embodiment, the public transportation management system 70 may obtain the real-time location information of the means of transportation 60 using either the GPS satellite or the beacon.

Figure 8:
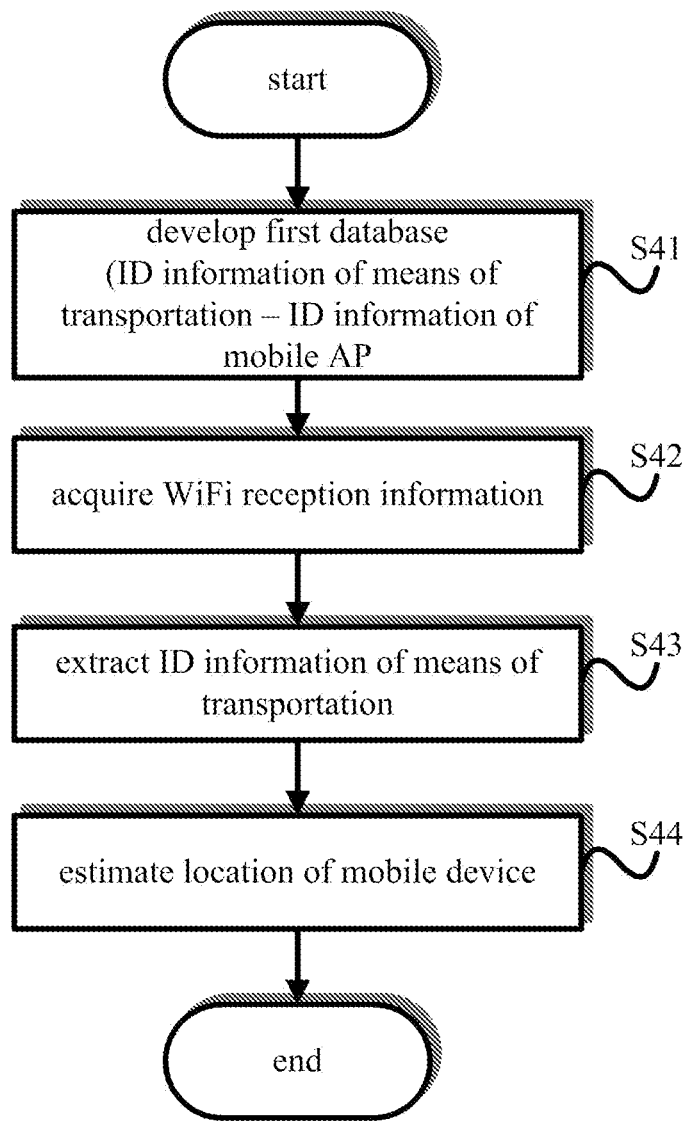
FIG. 8 is a flowchart illustrating a location estimation method according to a second embodiment of the present invention.

FIG. 8 illustrates an example of real-time location information of the means of transportation 60 which is provided by the public transportation management system 70.

The public transportation management entity generates the real-time location information of each means of transportation 60 to be used for public transportation management and provides the real-time location information for passengers. Accordingly, the present embodiment uses the real-time location information of the means of transportation.

FIG. 8 is a flowchart illustrating a location estimation method according to the second embodiment of the present invention.

In operation S41, a first database is developed by linking ID information of the means of transportation 60 and ID information of an AP installed in the means of transportation 60. The AP 20 installed in the means of transportation 60 is a mobile AP which allows access to a wireless WAN through WiFi. The operation S41 is similar to the operation S11 shown in FIG. 3 and a detailed description thereof will thus be omitted herein.

In operation S42, WiFi reception information generated by the mobile device 10 equipped with a WiFi module is acquired. The WiFi reception information includes the ID information of the AP 20 transmitting a WiFi signal. The operation S42 is similar to the operation S21 shown in FIG. 5 or the operation S31 shown in FIG. 6.

In operation S43, the ID information of the means of transportation 60 where the mobile device 10 is located is extracted using the WiFi reception information and the first database. The operation S43 is similar to the operation S22 shown in FIG. 5 or the operation S32 shown in FIG. 6.

In operation S44, real-time location information of the means of transportation 60 having the ID information of the means of transportation 60 extracted in the operation S43 is retrieved and estimated to be the location of the mobile device 10.

Specifically, the public transportation management system 70 is requested to retrieve the real-time location information of the means of transportation 60 having the ID information of the means of transportation 60 extracted in the operation S43. The real-time location information of the means of transportation 60 is received from the public transportation management system 70 and is estimated to be the location of the mobile device 10.

Alternatively, the real-time location information of the means of transportation 60 operated by the public transportation management system 70 is periodically received from the public transportation management system 70 and is maintained as the fourth database. When the location of the mobile device 10 is estimated in the operation S44, the real-time location information of the means of transportation 60 is retrieved from the fourth database.

On the other hand, the location estimation method according to the second embodiment may be performed in a different manner. Instead of receiving the real-time location information of the means of transportation 60 from the public transportation management system 70, the real-time location information of the means of transportation 60 may be internally developed and managed.

Specifically, a fourth database is developed and updated by linking the ID information of the means of transportation 60 with the real-time location information of the means of transportation 60. The real-time location information of the means of transportation 60 having the ID information of the means of transportation extracted in the operation S43 is retrieved from the fourth database and is estimated to be the location of the mobile device.

After the location estimation of the mobile device 10 is completed, the location server 40 transmits the location estimation result to the application server 30 or the mobile device 10 so that the location estimation result may be used for the location-based application services.

4. Application of Location Estimation Method and Location Estimation System (2)

Figure 9:
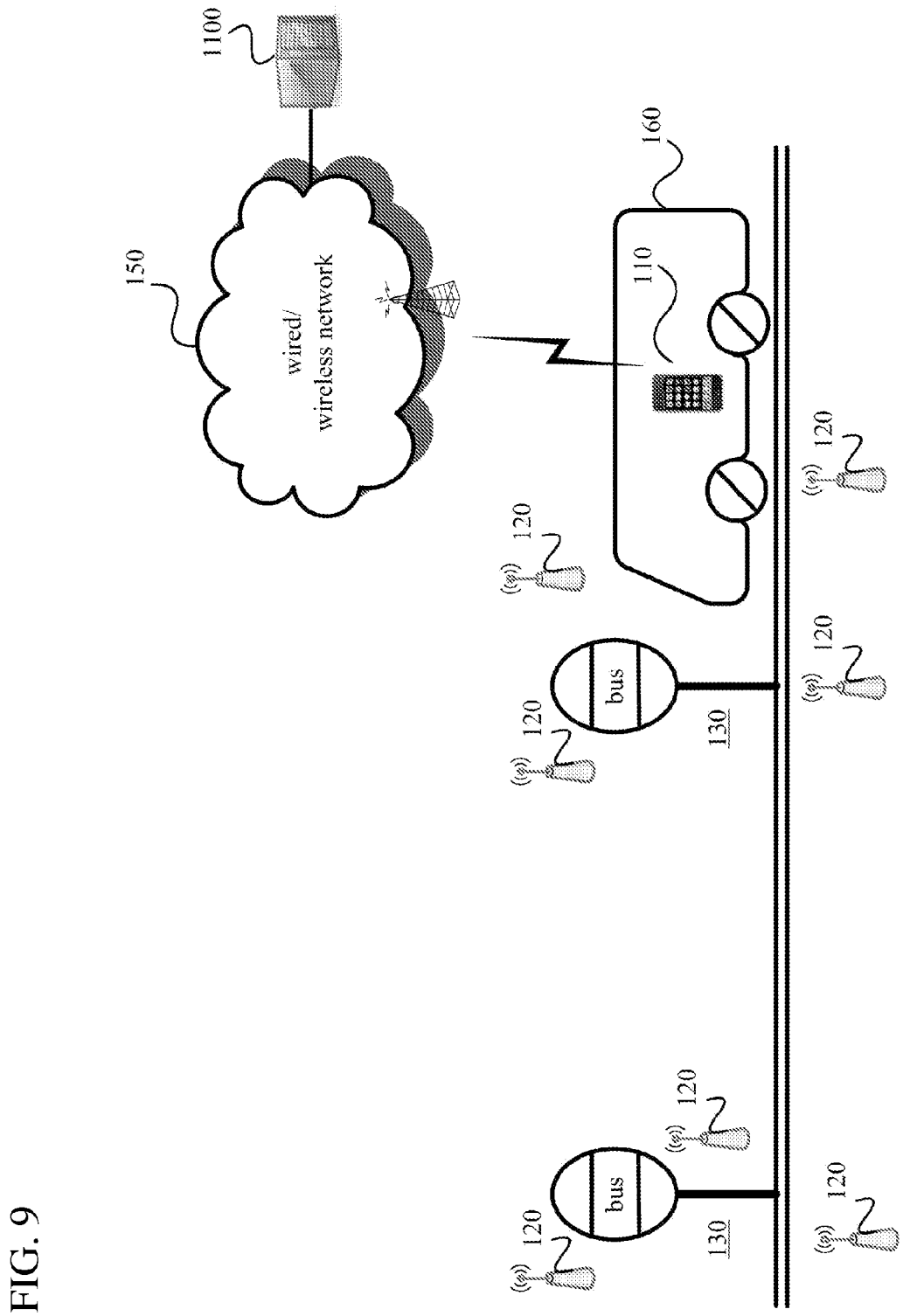
FIG. 9 is a schematic diagram illustrating a location-based service system to estimate a location of a mobile device located in means of transportation according to an exemplary embodiment of the present invention.

FIG. 9 is a schematic diagram illustrating a location-based service system to estimate a location of a mobile device located in means of transportation according to an exemplary embodiment of the present invention.

The location-based service system may include a mobile device 110, an AP 120, a location server 1100 and an application server (not shown).

Means of transportation 160 refers to any vehicle, such as bus, subway, train, ship or aircraft, that you can travel in or carry goods in. The means of transportation 160 may run along a predetermined route according to a timetable of means of transportation. Means of transportation 160 may have ID information to identify itself. For example, a bus may have a plate number, such as 'Seoul 30 Do 1843', as ID information; a subway may have a subway line number, such as 'T4001', as ID information; an aircraft may have an aircraft registration number, such as 'K193AA', as ID information. For such means of transportation consisting of a plurality of coupled passenger cars as subway or train, each passenger car may be assigned ID information or the means of transportation may be assigned ID information. The means of transportation 60 may stop at each stop station on a predetermined service route of the means of transportation 60. Examples of stop stations may include bus stops, subway stations, train stations, etc.

The AP 120 may be installed at or around the stop station 130 by an entity operating the stop station 130 or other houses, stores or offices.

The AP 120 serves as an access point to the wired/wireless network 150 through WiFi and may communicate with the mobile device 110 located in the means of transportation 160 through WiFi. The AP 120 may serve as an access point of the mobile device 110 to the wired/wireless network 150.

The mobile device 110 is a portable device equipped with a WiFi module. Examples of the mobile device 110 may include notebook, PDA, smart phone and notepad each equipped with the WiFi module. The mobile device 110 may access to the wired/wireless network 150 directly or through the AP 120.

The mobile device 110 receives a WiFi signal from the AP 120 at or around the stop station 130. In particular, the mobile device 110 may acquire ID information of the AP 120 included in the WiFi signal, and obtain received signal strength of the WiFi signal. A WiFi fingerprint is comprised of a set of the ID information of the AP 120, which can be received by the mobile device 110 based on its current location, and the received signal strength of the signal transmitted by the AP 120.

FIG. 10 illustrates an example of a WiFi fingerprint.

The WiFi fingerprint includes a pair of the ID information and received signal strength of the AP 120. If a plurality of APs 120 are present, a plurality of ID information and received signal strength of the APs 120 are obtained. Hence, the WiFi fingerprint may include a plurality of pairs of the ID information and received signal strength of the APs 120. Since the AP 120 or received signal strength of the AP 120 depends upon the location of the mobile device 110, different WiFi fingerprints may be obtained. However, although the mobile devices are located at different locations, similar WiFi fingerprints may be obtained if the mobile devices are located at close locations.

The location server 1100 is a system for estimating the location of the mobile device 110 located in the means of transportation 160. In another embodiment, the mobile device 110 or application server (not shown) may incorporate a part or whole of functions of the location server 1100. The location server 1100 may communicate with the mobile device 110 and another application server (not shown) over the wired/wireless network 150. The location server 1100 generally estimates the location of the mobile device 110 at the request of the mobile device 110 or the application server (not shown) and provides the estimated location information for the mobile device 110 or the application server (not shown).

Location-based services are provided based on the location information of the mobile device. Examples of the location-based application services may include find-pals service, stop station announcement service, shopping district advertising service, augmented reality service and social network service. The application server (not shown) is requested to provide location-based services based on the location information of the mobile device 110 provided from the location server 1100. The location server 1100 and the application server (not shown) may be incorporated into a single entity.

Figure 11:
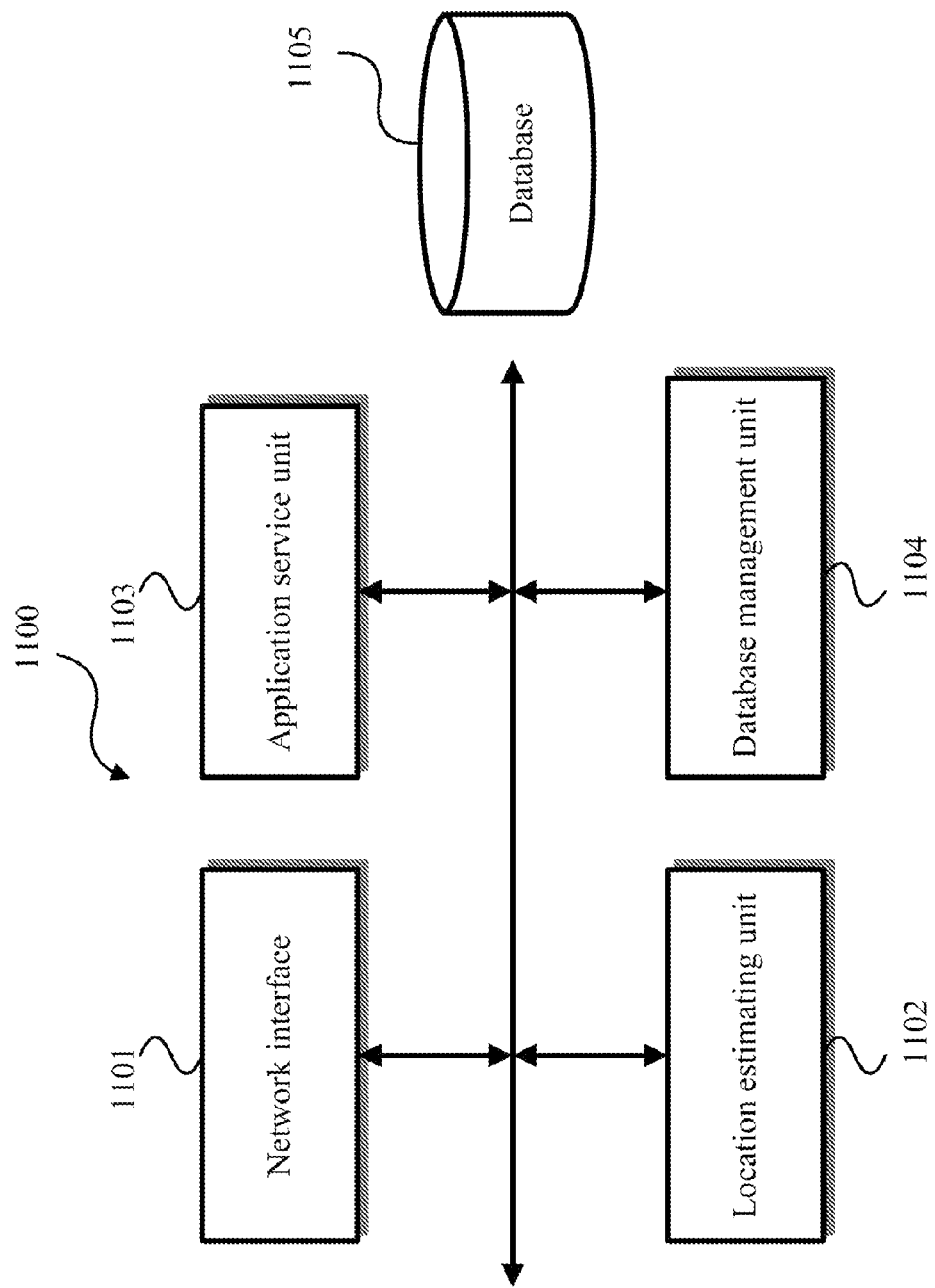
FIG. 11 is a block diagram illustrating a location server according to an exemplary embodiment of the present invention.

FIG. 11 is a block diagram illustrating the location server 1100 according to an exemplary embodiment of the present invention.

The location server 1100 may include a network interface 1101, a location estimating unit 1102, an application service unit 1103, a database management unit 1104 and a database 1105.

The network interface 1101 is a functional block used in interfacing with the wired/wireless network 150. The location server 1100 communicates with the mobile device 10, the application server (not shown), etc. through the network interface 1101.

The location estimating unit 1102 is a functional block which is responsible for estimating the location of the mobile device 110 using information from the mobile device 110 and the database 1105.

The application service unit 1103 is a functional block which is responsible for providing the location-based application service. The application service unit 1103 inquires of the location estimating unit 1102 about the location information of the mobile device 110, and provides the location-based application service using the location information of the mobile device 110. The function of the application service unit 1103 may be performed by another application server (not shown).

The database 1105 is a functional block used in storing a variety of information required to provide location estimation and location-based services. Examples of the information may include AP information, WiFi fingerprint information, transportation service information, stop station information, mobile device information, and subscriber information.

The database management unit 1104 is a functional block used in developing and managing the database 1105. Specifically, the database management unit 1104 is responsible for developing the database, and adding, updating and deleting data.

The location server 1100 equipped with these functional blocks will be more apparent with reference to the following location estimation method and database updating method for the location estimation. The location estimation method and the database updating method are performed in association with the location server 1100. The mobile device 110 or the application server (not shown) may incorporate the function of the location server 1100. In any case, the location-based service system generally performs the location estimation method and the database updating method.

5. Location Estimation Method: Third Embodiment

FIG. 12A is a flowchart illustrating a location estimation method according to the third embodiment of the present invention.

In operation S141, the location-based service system prepares for 'stop-station fingerprint database'.

It should be noted that the term 'preparation' of a database means a mechanical process of a system, such as development, download or store of the database, rather than a human act. This definition of 'preparation' is also applied to other embodiments.

For example, the database preparation means that the stop-station fingerprint database is developed in the database 1105 of the location server 1100 or is downloaded to the mobile device 110.

The stop-station fingerprint database is developed by linking a WiFi fingerprint at each stop station with ID information of each corresponding stop station. The WiFi fingerprint includes at least one pair of AP identification information and received signal strength, which are included in a received WiFi signal.

The stop-station fingerprint database includes a WiFi fingerprint of each stop station. For example, each stop station has one WiFi fingerprint. However, a subway station with a long platform may have a plurality of WiFi fingerprints associated with a plurality of points of the subway station.

In another example, the stop-station fingerprint database may be developed by collecting a plurality of WiFi fingerprints at a plurality of points of the same subway station and obtaining a sum of the WiFi fingerprints. For example, if a WiFi fingerprint is {<AP#0001, −40 dBm>, <AP#0002, −70 dBm>} at a first point of a first stop station and a WiFi fingerprint is {<AP#0001, −50 dBm>, <AP#0003, −60 dBm>} at a second point of the first stop station, the WiFi fingerprint at the first stop station may be {<AP#0001, −45 dBm>, <AP#0002, −70 dBm>, <AP#0003, −60 dBm>}. In this case, the receive signal strength is an arithmetic mean of received signal strengths at the three points.

FIG. 12B illustrates an example of a stop-station fingerprint database.

The stop-station fingerprint database is developed by linking a WiFi fingerprint at each stop station and ID information of each corresponding stop station. In the stop-station fingerprint database, the stop station and the WiFi fingerprint are linked to each other by means of 'fingerprint ID information'.

In operation S142, the location-based service system recognizes a stop station. Before recognizing the stop station, the mobile device 110 receives a WiFi signal at its location and acquires a WiFi fingerprint from the received WiFi signal. The WiFi fingerprint acquired by the mobile device 110 may be transmitted to the location server 1100 over the wired/wireless network 150 so that the location server 1100 may use the WiFi fingerprint for location estimation. Alternatively, if the mobile device 110 includes a part or whole of the stop-station fingerprint database, the mobile device 110 may recognize the stop station.

The location-based system recognizes the stop station by comparing the WiFi fingerprint acquired by the mobile device 110 located in the means of transportation 160 with a WiFi fingerprint of each stop station in the stop-station fingerprint database.

The WiFi fingerprint acquired by the mobile device 110 located in the means of transportation 160 and a WiFi fingerprint of each stop station in the stop-station fingerprint database may be compared with each other in a variety of ways. For example, the WiFi fingerprint may be considered as a vector with a vector axis of an AP and a size of received signal strength. In this case, the acquired WiFi fingerprint is expressed as a vector and the WiFi fingerprint at each stop station is also expressed as a vector. A Euclidean distance between the acquired WiFi fingerprint and the WiFi fingerprint at a stop station may be calculated. The Euclidean distance may be considered as a similarity therebetween. If the similarity is greater than a predetermined value, the mobile device may be determined to be located at a corresponding stop station. The method of determining a stop station by comparing the acquired WiFi fingerprint with the WiFi fingerprint at each stop station in the stop-station fingerprint database may be performed using probability or other ways.

If the means of transportation 160 is located between stop stations 130, the stop station will not be recognized. However, if the means of transportation 160 is located at a stop station or approaches a stop station, the stop station may be recognized, thereby estimating the location of the mobile device 110.

6. Location Estimation Method: Fourth Embodiment

Figure 13:
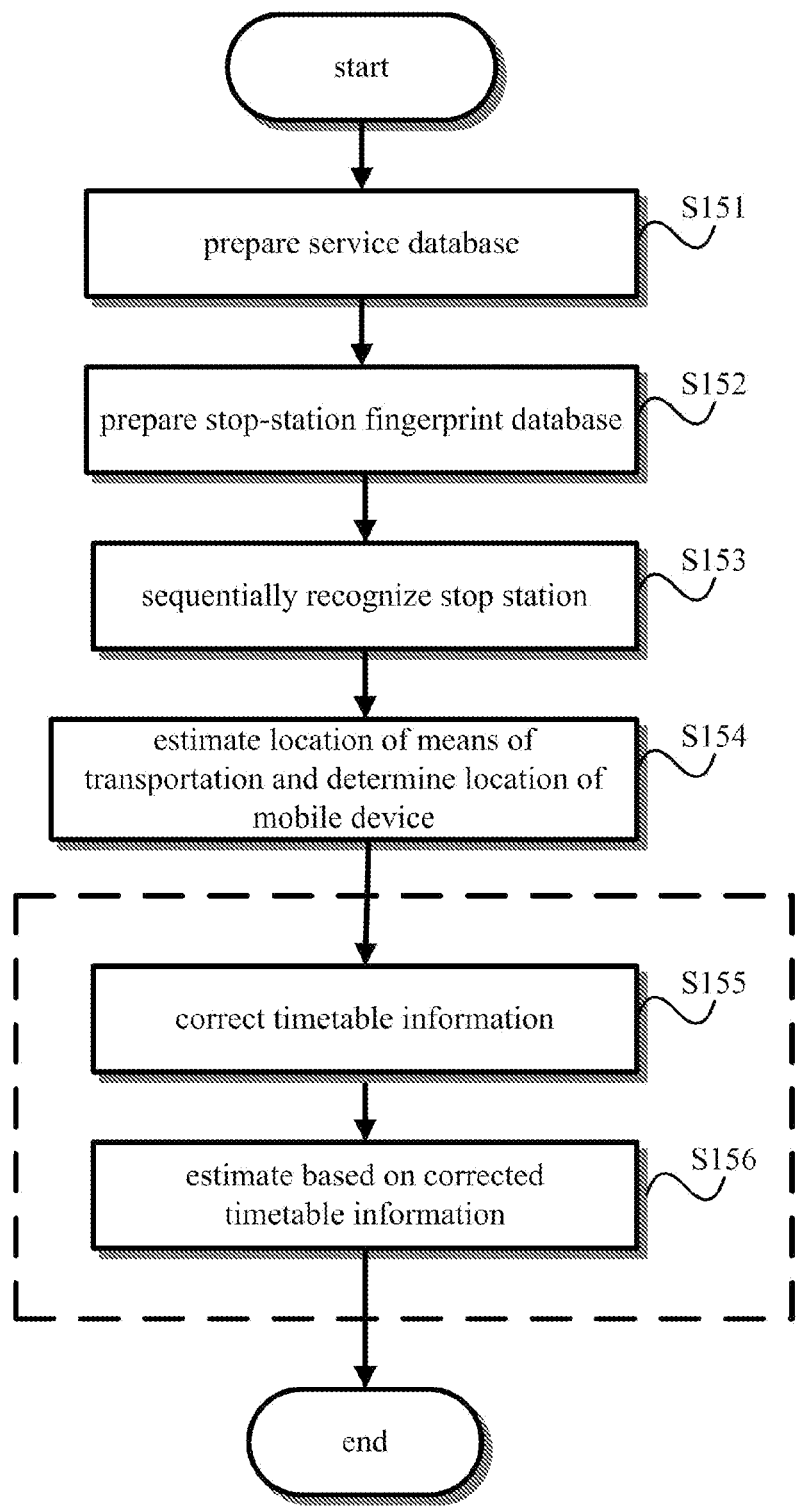
FIG. 13 is a flowchart illustrating a location estimation method according to a fourth embodiment of the present invention.

FIG. 13 is a flowchart illustrating a location estimation method according to the fourth embodiment of the present invention.

In operation S151, a transportation service database including route information and timetable information of the means of transportation 160 running along a predetermined route is prepared. The transportation service database includes the route information and the timetable information. The route information includes ID information of each stop station on the predetermined route. The stop-station ID information is used to identify each stop station. If the means of transportation 160 is determined, each stop station on a route of the means of transportation 160 and a timetable of the means of transportation 160 may be determined from the route information of the means of transportation 160.

In operation S152, the location-based service system prepares the stop-station fingerprint database which is developed by linking a WiFi fingerprint at each stop station on a predetermined route (hereinafter referred to as 'stop-station WiFi fingerprint') with ID information of each corresponding stop station. The WiFi fingerprint is comprised of at least one pair of AP identification information and received signal strength included in a received WiFi signal. The stop-station fingerprint database may be similar to the stop-station fingerprint database described in the first database, as shown in FIG. 12B, for example.

In operation S153, the location-based service system sequentially recognizes two or more stop stations which the means of transportation approaches. In this case, the WiFi fingerprint acquired by the mobile device 110 located in the means of transportation in motion and the stop-station WiFi fingerprint in the stop-station fingerprint database are repeatedly compared.

The WiFi fingerprint acquired by the mobile device 110 and the stop-station WiFi fingerprint in the stop-station fingerprint database may be compared in a variety of ways, as described in the third embodiment.

In operation S154, the location-based service system estimates a location of the means of transportation in motion and recognizes the location of the means of transportation as a location of the mobile terminal. In this case, the two or more stop stations sequentially recognized and the route information in the transportation service database are used. Since the means of transportation runs along the predetermined route, the movement direction of the means of transportation may be determined using the two or more stop stations sequentially recognized and the route information. For example, if two stop stations 'Gangnam station' and 'Gyodae station' are sequentially recognized and a subway route is obtained, the means of transportation is recognized as Seoul Subway Line No. 2 which includes the stations 'Gangnam station' and 'Gyodae station'. Further, the running direction of the subway may be determined from information on the two stations sequentially recognized. If no WiFi fingerprint is obtained after the two stop stations are recognized, the subway may be estimated to depart from the station 'Gyodae station' and be on a way to the next station.

On the other hand, if a stop station is very large in size, the stop station may be associated with two or more WiFi fingerprints. For example, one end point of a platform where a subway enters and the other end point of the platform where the subway leaves may be associated with two WiFi fingerprints. In such a subway station with a long platform, a plurality of APs are provided to cover the entire area of the subway station. Accordingly, the WiFi fingerprints may be different at the two points. In this case, without the need to recognize two stop stations, WiFi fingerprints associated with two or more different points at the same stop station may be acquired and used. In the present embodiment, sequential recognition of two different points at the same station is considered to be equivalent to sequential recognition of two different stations.

On the other hand, as the means of transportation approaches the stop station, a similarity between the WiFi fingerprint acquired by the mobile terminal and a WiFi fingerprint in the stop-station fingerprint database will be increased. However, as the means of transportation departs from the stop station, the similarity will be decreased. Taking it into account, a period of a mobile terminal acquiring a WiFi fingerprint may be changed. For example, although a WiFi fingerprint is usually acquired in a period of k seconds, the WiFi fingerprint may be acquired in a period of k/2 or k/4 seconds if a similarity between the acquired WiFi fingerprint and a WiFi fingerprint in the stop-station fingerprint database is increased. On the other hand, if the similarity is decreased, the WiFi fingerprint is acquired in a period of k seconds as usual. In this case, it is possible to save a battery.

The location of the mobile device may be estimated in the operation S154. Since the means of transportation is in motion, the mobile device needs to continuously acquire a WiFi fingerprint and the location-based service system needs to repeatedly compare the acquired WiFi fingerprint with a stop-station WiFi fingerprint in the stop-station fingerprint database in order to keep track of the mobile terminal. However, the acquisition and comparison of WiFi fingerprints will take a great deal of time and resource.

In order to reduce the time and resource required to acquire and compare the WiFi fingerprints, the timetable information of the means of transportation may be used in another embodiment.

In the operation S154, the location of the means of transportation is estimated at a particular time. In operation S155, the timetable information is corrected by comparing the estimated location of the means of transportation with the timetable information of the means of transportation. That is, corrected timetable information is obtained. The timetable information refers to a service schedule of the means of transportation which is predetermined by an entity operating the means of transportation. However, the means of transportation may fail to follow the timetable information for some unavoidable reasons. In this case, a real-time error may be corrected based on the location information of the means of transportation which is estimated in the operation S154.

In operation S156, without acquiring a WiFi fingerprint, the location of the means of transportation is estimated based on the corrected timetable information and is recognized as the location of the mobile terminal.

The location of the mobile terminal may be used for a variety of location-based services. For example, a stop-station announcement service will be described.

A user using a mobile device inputs a stop station to get off to the location-based service system. The user may input the stop station using, for example, drop-down menu, retrieval and selection, key input, etc. on the interface of the mobile device. The user may input a route name including the stop station and the location-based service system may use the route name information.

If an estimated location of the mobile device approaches the stop station which is input by the user, the user is notified of the stop station through the mobile device.

7. Method of Updating Location Estimation Database (1): Fifth Embodiment

For a location-based service provided based on a database developed by collecting WiFi fingerprints of each stop station in a subway or a bus, it should be considered that WiFi environment of each stop station or surrounding thereof is changed over time.

More specifically, as new APs are installed or existing APs are out of order or removed, WiFi fingerprints need to be corrected accordingly. In this case, collecting new WiFi fingerprints or correcting existing WiFi fingerprints at regular intervals will take a great amount of time and cost.

In the present embodiment, a method of easily updating WiFi fingerprints will be described.

The location estimation database is developed by linking a WiFi fingerprint at a point of interest which is a reference in estimating a location of a mobile device (hereinafter referred to as 'reference WiFi fingerprint') with ID information of the point of interest.

The location estimation database may be incorporated into the location server 1100 of the location-based service system shown in FIG. 9. In this case, the location estimation database may be included in the database 1105 of the location server 1100. The location estimation database is updated by an apparatus managing the location estimation database. For example, the location estimation database may be updated by the database management unit 1104 of the location server 100. The location estimation database may be installed in any place or by any entity.

The term 'point of interest' refers to a reference point in estimating a location of a mobile device. Each stop station may be a point of interest. For a large station or a large platform, each stop station may include a plurality of points of interest. In the present embodiment, the point of is interest is not necessarily associated with a stop station. For example, a point where a WiFi fingerprint is collected to provide a location-based service may be a point of interest.

For the location estimation database, the reference WiFi fingerprint and the ID information of a point of interest are linked together. This is similar to a case where the stop-station WiFi fingerprint and the stop-station ID information are linked together as shown in FIG. 12.

In the present embodiment, it should be noted that information acquired by a mobile device of a location-based service subscriber is used in updating the location estimation database.

Figure 14:
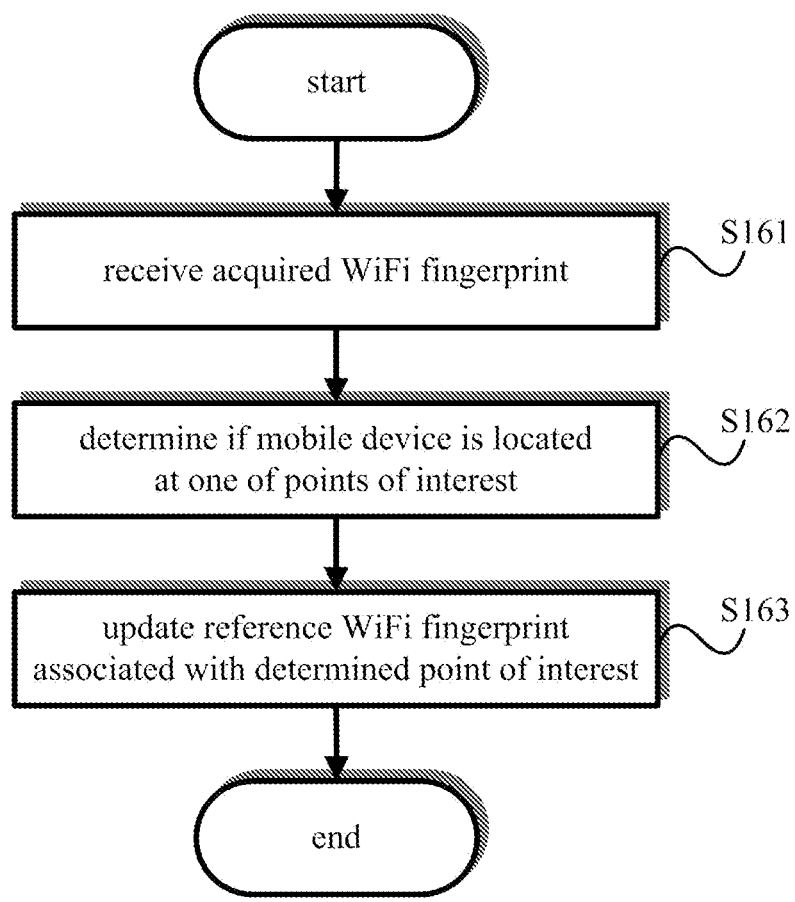
FIG. 14 is a flowchart illustrating a method of updating a location estimation database according to a fifth embodiment of the present invention.

FIG. 14 is a flowchart illustrating a method of updating a location estimation database according to a fifth embodiment of the present invention.

In operation S161, a WiFi fingerprint acquired by a mobile device of a location-based service user (hereinafter referred to as 'acquired WiFi fingerprint') is received. The WiFi fingerprint is comprised of at least one pair of AP identification information and received signal strength included in a WiFi signal received by the mobile device.

For the user to use the location-based service, the user's mobile device acquires and provides the WiFi fingerprint for the location-based service system. The location-based service system compares the acquired WiFi fingerprint with the location estimation database and uses the comparison result in estimating the location of the mobile device. In the present embodiment, the comparison result is used in updating the location estimation database as well as in estimating the location of the mobile device.

In operation S162, the location-based service system compares the acquired WiFi fingerprint with the location estimation database and determines if the mobile device is located at any one of points of interest included in the location estimation database. In this case, the acquired WiFi fingerprint does not need to be identical to a reference WiFi fingerprint included in the location estimation database. For example, if the above-mentioned similarity is greater than a predetermined value, the mobile device is determined to be located at a point of interest associated with the reference WiFi fingerprint. For example, the similarity may be calculated by a Euclidean distance between the acquired WiFi fingerprint and the reference WiFi fingerprint included in the location estimation database.

It should be understood that the operations S161 and S162 may have in common with operations performed in a process of estimating the location of the mobile device to provide the location-based service.

In operation S163, if the mobile device is determined to be located at one of the points of interest included in the location estimation database in the operation S162, the location-based service system updates the reference WiFi fingerprint associated with the determined point of interest using the acquired WiFi fingerprint.

For example, if there is a new AP which is present in the acquired WiFi fingerprint but not in the reference WiFi fingerprint associated with the determined point of interest, ID information and received signal strength of the new AP may be added or expected to be added to the reference WiFi fingerprint associated with the determined point of interest. The new AP may be included in the reference WiFi fingerprint immediately or only if a predetermined condition, such as a predetermined period, a predetermined appearance frequency, or a predetermined appearance frequency within a predetermined period, is satisfied.

For example, if there is an AP which is present in the reference WiFi fingerprint associated with the determined point of interest but not in the acquired WiFi fingerprint, ID information and received signal strength of the AP may be deleted or expected to be deleted from the reference WiFi fingerprint associated with the determined point of interest. The AP may be deleted from the reference WiFi fingerprint immediately or only if a predetermined condition, such as a predetermined period, a predetermined frequency, or a predetermined frequency within a predetermined period, is satisfied.

8. Method of Updating Location Estimation Database (2): Sixth Embodiment

Figure 15:
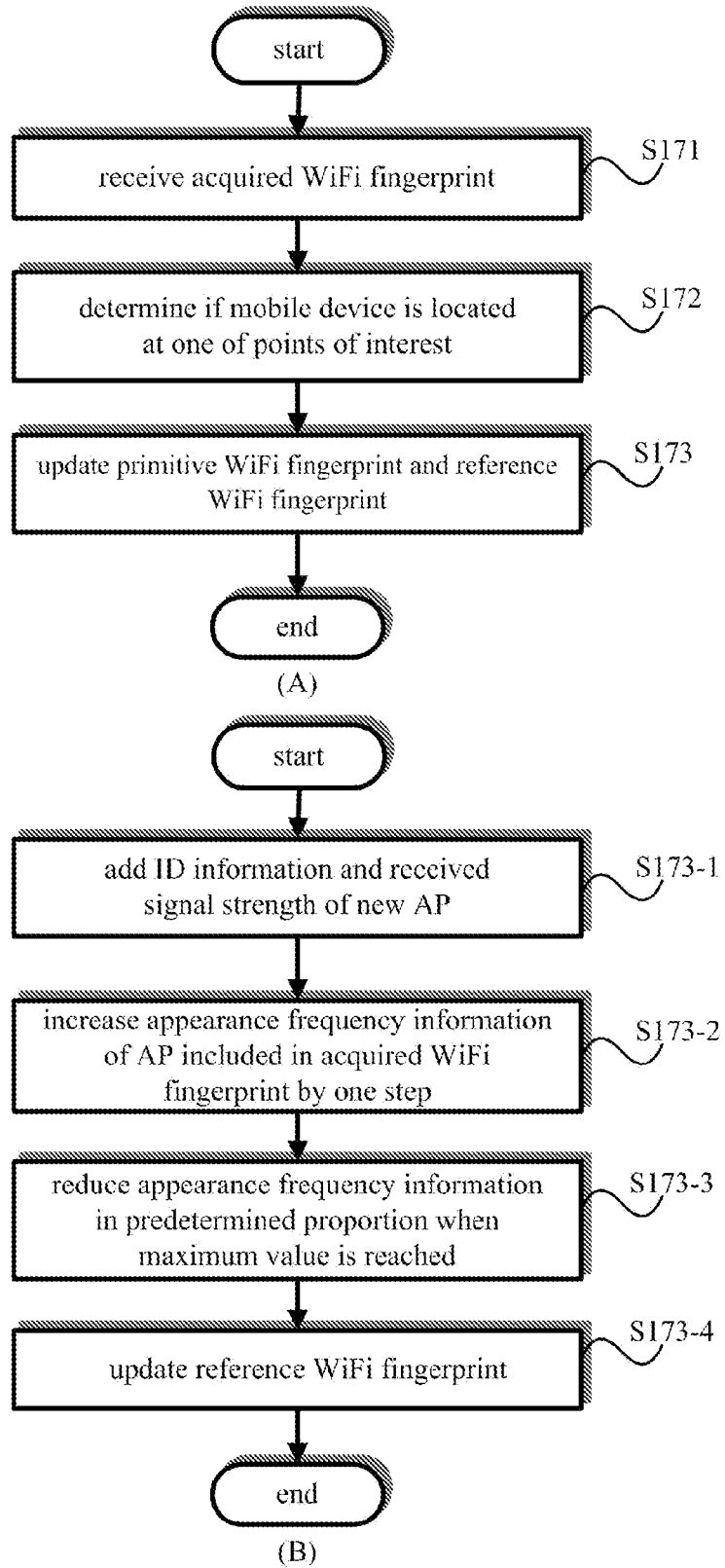
FIG. 15A is a flowchart illustrating a method of updating a location estimation database according to a sixth embodiment of the present invention.
FIG. 15B is a flowchart illustrating operation S173 in a method of updating a location estimation database according to the sixth embodiment of the present invention.

FIG. 15A is a flowchart illustrating a method of updating a location estimation database according to a sixth embodiment of the present invention.

The location estimation database is developed by linking a WiFi fingerprint at a point of interest which is a reference in determining a location of a mobile device (hereinafter referred to as 'reference WiFi fingerprint') with ID information of the point of interest.

In the sixth embodiment, it should be noted that 'primitive WiFi fingerprint' and 'reference WiFi fingerprint' are different. The term 'primitive WiFi fingerprint' refers to a WiFi fingerprint including a plurality of pairs of ID information and received signal strength of all APs which can be received at a point of interest. The term 'reference WiFi fingerprint' includes a part of the APs in the primitive WiFi fingerprint. That is, the reference WiFi fingerprint is a subset of the primitive WiFi fingerprint. Accordingly, in the sixth embodiment, a plurality of pairs of ID information and received signal strength of all APs, which can be received at the point of interest, are not used but only a part of the primitive WiFi fingerprint is used.

As such, it is possible to reduce the time and resource required in comparing the WiFi fingerprints for location estimation and to increase the efficiency. Further, it is possible to prevent confusion caused by an AP which passes a point of interest.

In operation S171, the location-based service system receives a WiFi fingerprint acquired by a mobile device of a location-based service user (hereinafter referred to as 'acquired WiFi fingerprint').

In operation S172, the location-based service system compares the acquired WiFi fingerprint with the reference WiFi fingerprint in the location estimation database and determines if the mobile device is located at any one of points of interest included in the location estimation database. The operations S171 and S172 are similar to the operations S161 and S162 in the fifth embodiment.

For example, if a similarity between the acquired WiFi fingerprint and the reference WiFi fingerprint in the location estimation database is greater than a predetermined value, the mobile device is determined to be located at a point of interest associated with the reference WiFi fingerprint. The similarity may be calculated by a Euclidean distance between the acquired WiFi fingerprint and the reference WiFi fingerprint included in the location estimation database.

In operation S173, if the mobile device is determined to be located at any one of the points of interest included in the location estimation database in the operation S172, the primitive WiFi fingerprint and the reference WiFi fingerprint which are associated with the determined point of interest using the acquired WiFi fingerprint are updated.

FIG. 15B is a flowchart illustrating the operation S173 in the method of updating the location estimation database according to the sixth embodiment of the present invention.

The location estimation database may further include 'appearance frequency information' associated with each AP identification information included in the primitive WiFi fingerprint. The appearance frequency information refers to information about the number of times the AP appears. Based on the appearance frequency information, it is determined if an AP is added to or deleted from the reference WiFi fingerprint.

If the mobile device is determined to be located at one of the points of interest included in the location estimation database in the operation S172, the appearance frequency information of the primitive WiFi fingerprint associated with the determined point of interest is updated.

In operation S173-1, if there is a new AP which is present in the acquired WiFi fingerprint but not in the primitive WiFi fingerprint associated with the determined point of interest, ID information and received signal strength of the new AP are added to the primitive WiFi fingerprint associated with the determined point of interest. In operation S173-2, the appearance frequency of the AP included in the acquired WiFi fingerprint is increased by one step.

In operation S173-3, it is determined if any one of appearance frequency information associated with the AP included in the primitive WiFi fingerprint reaches a predetermined maximum value, and if one of the appearance frequency information is determined to have reached the maximum value, the appearance frequency information associated with all APs included in the primitive WiFi fingerprint is reduced in a predetermined proportion.

In operation S173-4, the reference WiFi fingerprint is updated. For example, a predetermined number of APs, which are selected in an order of high appearance frequency in the primitive WiFi fingerprint, may be included in the reference WiFi fingerprint. If there is a change in the order of high appearance frequency, APs included in the reference WiFi fingerprint are changed accordingly.

For example, if a primitive WiFi fingerprint and appearance frequency information of a stop station is represented as {<AP#001, −50 dBm, 6>, <AP#002, −55 dBm, 5>, <AP#003, −60 dBm, 4>, <AP#004, −63 dBm, 3>}, a reference WiFi fingerprint having two APs selected in an order of high appearance frequency information is {<AP#001, −50 dBm>, <AP#002, −55 dBm>}. In this case, a WiFi fingerprint acquired by the mobile device, {<AP#001, −52 dBm>, <AP#002, −53 dBm>, <AP#005, −55 dBm>}, is compared with the reference WiFi fingerprint, and the mobile device may be determined to be located at the stop station. After the determination, <AP#005, −55 dBm> of the new AP#005 is added to the primitive WiFi fingerprint, and the appearance frequency information of the AP appearing in the acquired WiFi fingerprint is increased by one. Accordingly, the updated primitive WiFi fingerprint and appearance frequency information results in {<AP#001, −50 dBm, 7>, <AP#002, −55 dBm, 6>, <AP#003, −60 dBm, 4>, <AP#004, −63 dBm, 3>, <AP#005, −55 dBm, 1>}. In a case where the maximum value of the appearance frequency information is set to ten (10), if appearance frequency information associated with an AP becomes equal to ten (10), all APs included in the primitive WiFi fingerprint are reduced in a predetermined proportion, for example, by a half. Accordingly, by setting such an upper limit or performing such a reducing process, it is possible to deal with the addition or removal of APs. Assuming that it is not possible to set the upper limit or perform the reducing process, it is difficult to remove defective or old APs from the reference WiFi fingerprint or to add new APs to the reference WiFi fingerprint.

9. Method of Updating Location Estimation Database (3): Seventh Embodiment

In the seventh embodiment, it should be noted that the location estimation database does not use a WiFi fingerprint but an AP set.

The location estimation database used in estimating a location of a mobile device is developed by linking a set of identification information of APs which can receive a WiFi signal at a point of interest (hereinafter referred to as 'reference AP set') with ID information of the point of interest.

Figure 16:
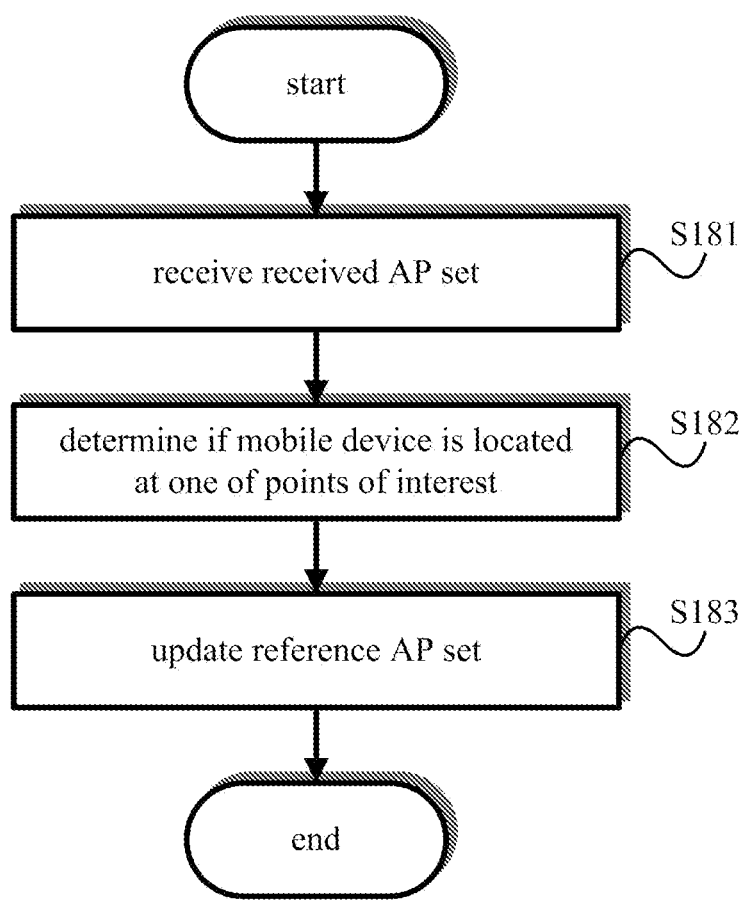
FIG. 16 is a flowchart illustrating a method of updating a location estimation database according to a seventh embodiment of the present invention.

FIG. 16 is a flowchart illustrating a method of updating a location estimation database according to a seventh embodiment of the present invention.

In operation S181, the location-based service system receives a set of AP identification information extracted from a WiFi signal received by a mobile device of a location-based service user (hereinafter referred to as 'received AP set'). It should be understood that the location-based service system may receive a WiFi fingerprint. In this case, since the WiFi fingerprint includes AP identification information, the AP set acquired by the mobile device is received.

In operation S182, the location-based service system compares the received AP set with the location estimation database and determines if the mobile device is located at any one of points of interest included in the location estimation database.

For example, if the received AP set includes a predetermined proportion of APs or more in the reference AP set, the mobile device may be determined to be located at a corresponding point of interest. For example, assuming that a reference AP set of a point of interest {AP#001, AP#002, AP#003} is included in the location estimation database and a received AP set is {AP#001, AP#003, AP#004}, the mobile device may be determined to be located at the point of interest associated with the reference AP set if a proportion for the determination is set to 50%. Alternatively, if the received AP set includes a predetermined number of APs or more in the reference AP set, the mobile device may be determined to be located at a corresponding point of interest. As such, determining if the mobile device is located at a point of interest in the location estimation database by comparing the received AP set with the reference AP set may be performed in a variety of ways.

However, the updating method according to the seventh embodiment does not require 100% match since it is not possible to implement the updating method under the condition.

In operation S183, if the mobile device is determined to be located at a point of interest included in the location estimation database in the operation S182, the location-based service system updates the reference AP set associated with the determined point of interest using the received AP set. In the above-mentioned example, AP190 004 may be added to the reference AP set including {AP#001, AP#002, AP#003}.

For example, if there is a new AP which is present in the received AP set but not in the reference AP set associated with the determined point of interest, ID information of the new AP may be added or expected to be added to the reference AP set associated with the determined point of interest. The new AP may be included in the reference AP set immediately or only if a predetermined condition, such as a predetermined period, a predetermined appearance frequency, or a predetermined appearance frequency within a predetermined period, is satisfied.

For example, if there is an AP which is present in the reference AP set associated with the determined point of interest but not in the received AP set, ID information and received signal strength of the AP may be deleted or expected to be deleted from the reference AP set associated with the determined point of interest. The AP may be deleted from the reference AP set immediately or only if a predetermined condition, such as a predetermined period, a predetermined frequency, or a predetermined frequency within a predetermined period, is satisfied.

10. Method of Updating Location Estimation Database (4): Eighth Embodiment

As in the sixth embodiment, in addition to the reference AP set, 'primitive AP set' may be used. The term 'primitive AP set' refers to a set of ID information of all APs which can be received at a point of interest. The reference AP set includes a part of the APs in the primitive AP set. That is, the reference AP set is a subset of the primitive AP set. Accordingly, the ID information of all APs, which can be received at the point of interest, are not used as 'the reference AP set' but only a part of the primitive AP set is used as the reference AP set.

As such, it is possible to reduce the time and resource required in comparing the AP sets for location estimation and to increase the efficiency. Further, it is possible to prevent confusion caused by a mobile AP which passes a point of interest.

Figure 17:
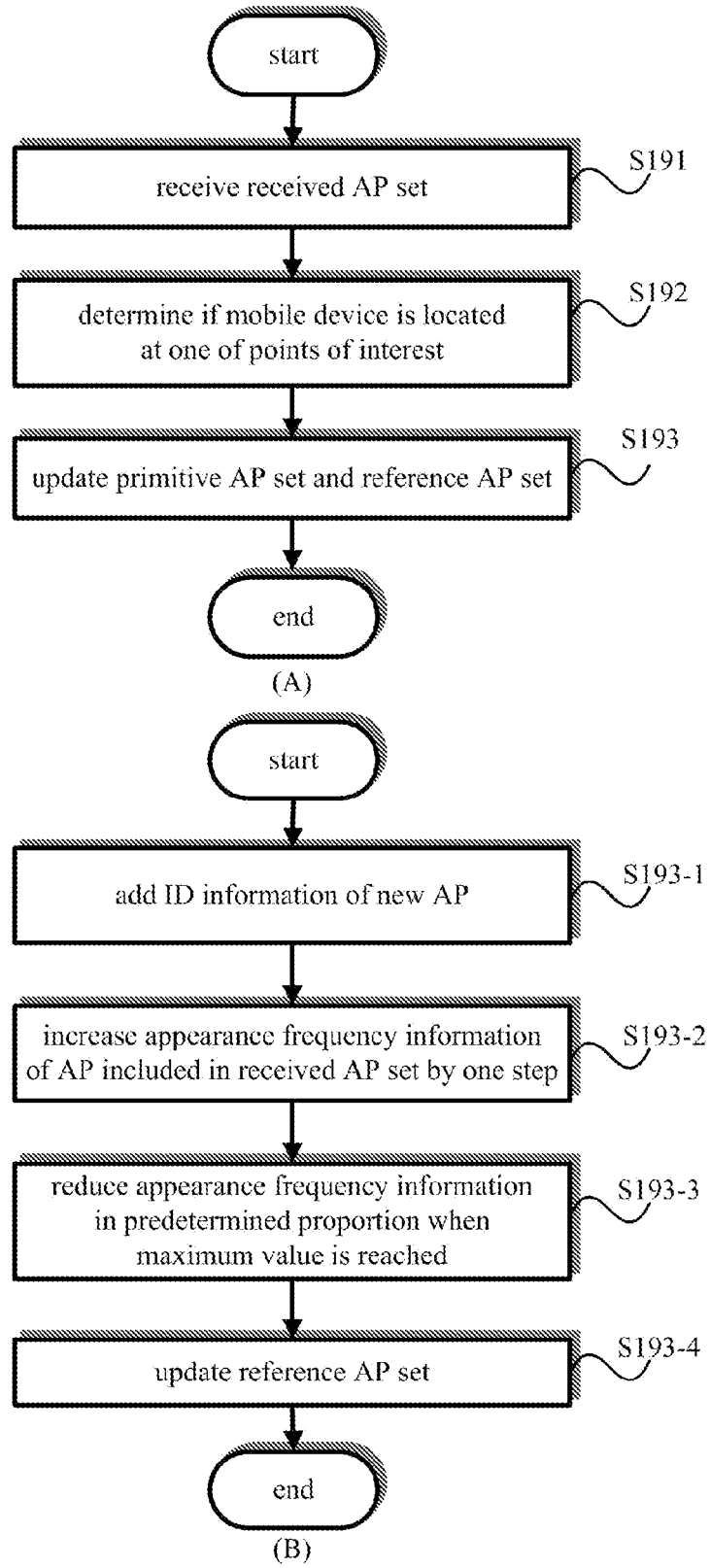
FIG. 17A is a flowchart illustrating a method of updating a location estimation database according to an eighth embodiment of the present invention.
FIG. 17B is a flowchart illustrating operation S193 in the method of updating the location estimation database according to the eighth embodiment of the present invention.

FIG. 17A is a flowchart illustrating a method of updating a location estimation database according to an eighth embodiment of the present invention.

In operation S191, the location-based service system receives an AP set acquired by a mobile device of a location-based service user (hereinafter referred to as 'received AP set'). It should be understood that the location-based service system may receive a WiFi fingerprint. In this case, since the WiFi fingerprint includes AP identification information, the AP set acquired by the mobile device is received.

In operation S192, the location-based service system compares the received AP set with the reference AP set in the location estimation database and determines if the mobile device is located at any one of points of interest included in the location estimation database.

For example, if the received AP set includes a predetermined proportion of APs or more in the reference AP set, the mobile device may be determined to be located at a corresponding point of interest. Alternatively, if the received AP set includes a predetermined number of APs or more included in the reference AP set, the mobile device may be determined to be located at a corresponding point of interest. As such, determining if the mobile device is located at a point of interest in the location estimation database by comparing the received AP set with the reference AP set may be performed in a variety of ways.

In operation S193, if the mobile device is determined to be located at a point of interest included in the location estimation database in the operation S192, the location-based service system updates the primitive AP set and the reference AP set associated with the determined point of interest using the received AP set.

FIG. 17B is a flowchart illustrating the operation S193 in the method of updating the location estimation database according to the eighth embodiment of the present invention.

The location estimation database may further include 'appearance frequency information' associated with each AP identification information included in the primitive AP set. The appearance frequency information refers to information about the number of times the AP appears. Based on the appearance frequency information, it is determined if an AP is added to or deleted from the reference AP set.

If the mobile device is determined to be located at one of the points of interest included in the location estimation database in the operation S192, the appearance frequency information of the primitive AP set associated with the determined point of interest is updated.

In operation S193-1, if there is a new AP which is present in the received AP set but not in the primitive AP set associated with the determined point of interest, ID information of the new AP may be added or expected to be added to the primitive AP set associated with the determined point of interest. In operation S193-2, the appearance frequency of the AP included in the received AP set is increased by one step.

In operation S193-3, it is determined if any one of appearance frequency information associated with the AP included in the primitive AP set reaches a predetermined maximum value, and if one of the appearance frequency information is determined to have reached the maximum value, the appearance frequency information associated with all APs included in the primitive AP set is reduced in a predetermined proportion.

In operation S193-4, the reference AP set is updated. For example, a predetermined number of APs, which are selected in an order of high appearance frequency in the primitive AP set, may be included in the reference AP set. If there is a change in the order of high appearance frequency, APs included in the reference WiFi fingerprint are changed accordingly.

It should be understood that the updating method according to the fifth to eighth embodiments may be performed in the process of performing the location estimation method according to the third and fourth embodiments.

As apparent from the above description, it is possible to easily and accurately acquire the location information of the mobile device which is located in the means of transportation in motion.

Further, it is possible to easily and accurately acquire the location information of the mobile device located in the means of transportation in motion without using GPS signals or base station information for cellular phones.

Further, it is possible to easily and accurately acquire the location information of the mobile device located in the means of transportation which has a roof or runs through areas where GPS signals will not be received.

Further, the AP 120 installed in the means of transportation can be used for the location estimation without modifying or altering the AP.

Further, it is possible to make an accurate location estimation so long as the service information of the means of transportation is accurately updated. In particular, the present invention is very useful for the location estimation if the means of transportation actually runs in compliance with the scheduled service information.

Further, it is possible to easily and accurately estimate the location of the mobile device located in the means of transportation by correcting a mismatch between the predetermined transportation service information and actual transportation service.

Further, it is possible to easily and accurately estimate the location of the mobile device located in the means of transportation using real-time location information of the means of transportation provided by a public transportation management system and the above-mentioned first database internally developed.

Further, it is possible to easily and accurately estimate the location of the mobile device located in the means of transportation using the above-mentioned first and fourth databases.

Further, it is possible to easily and accurately acquire the location information of the mobile device located in the means of transportation in motion.

Further, it is possible to easily and accurately estimate the location of the mobile device located in such means of transportation as ship or aircraft which runs through areas where base station signals for cellular phones will not be received.

Further, APs added to or removed from the stop station can be automatically updated in the database.

Further, it is possible to automatically deal with changes in AP environment which are caused by addition, removal or breakdown of APs at or around stop stations or points of interest.

Further, extra workers or costs to collect data at regular intervals are not required in updating WiFi fingerprints or AP sets.

Further, when existing APs are removed or new APs are added, it is possible to promptly update the location estimation database accordingly. As a result, it is possible to increase the accuracy of the location estimation.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for estimating a location of a mobile device located in means of transportation, the method comprising:
    developing a first database by linking identification (ID) information of the means of transportation with ID information of an access point (AP) installed in the means of transportation, the AP being a mobile AP which allows access to a wireless wide area network (WAN) through WiFi;
    developing a second database by linking ID information of the means of transportation with service information of the means of transportation, the service information including route information and timetable information;
    developing a third database by linking ID information of a stop station of the means of transportation with ID information of an AP installed at the stop station, the AP being a stationary AP which allows access to a wired/wireless network through WiFi;
    acquiring WiFi reception information generated by the mobile device equipped with a WiFi module, the WiFi reception information including ID information of an AP transmitting a WiFi signal;
    extracting the ID information of the means of transportation in which the mobile device is located using the acquired WiFi reception information and the first database;
    extracting the ID information of the stop station of the means of transportation in which the mobile device is located using the acquired WiFi reception information and the third database; and
    estimating a location of the mobile device using the extracted ID information of the means of transportation, the extracted ID information of the stop station, and the second database.

2. The method of claim 1, wherein the estimating of the location of the mobile device comprises:
    extracting the route information and the timetable information of the means of transportation associated with the extracted ID information of the means of transportation from the second database;
    correcting the extracted timetable information using the extracted ID information of the stop station and time information; and
    estimating the location of the mobile device by associating time information with the extracted route information and the corrected timetable information.

3. The method of claim 1, further comprising determining ID information of other APs included in the acquired WiFi reception information than the ID information of the AP associated with the extracted ID information of the stop station and the ID information of the AP associated with the extracted ID information of the means of transportation as being ID information of APs newly installed at the stop station and adding the ID information of the other APs to the third database.

4. The method of claim 1, wherein the extracting of the ID information of the means of transportation comprises:
    checking ID information of an AP included in the acquired WiFi reception information; and
    extracting ID information of means of transportation associated with the checked ID information of the AP from the first database.

5. The method of claim 1, wherein the WiFi reception information further comprises received signal strength of the WiFi signal transmitted from the AP, and
    wherein the extracting of the ID information of the means of transportation comprises:
    checking ID information of an AP having a greatest one of received signal strengths included in the acquired WiFi reception information; and
    extracting ID information of means of transportation associated with the checked ID information of the AP from the first database.

6. A method of estimating a location of a mobile device using a WiFi signal, the method comprising:
    preparing a stop-station fingerprint database by linking a WiFi fingerprint at each stop station on a route of means of transportation (hereinafter referred to as 'stop-station WiFi fingerprint') with identification (ID) information of each corresponding stop station, the WiFi fingerprint including at least one pair of ID information and received signal strength of access point (AP) included in a received WiFi signal; and
    recognizing a stop station by comparing a WiFi fingerprint acquired by a mobile device located in the means of transportation (hereinafter referred to as 'acquired WiFi fingerprint') with the stop-station WiFi fingerprint in the stop-station fingerprint database.

7. A method of estimating a location of a mobile device using a WiFi signal in a location-based service system, the method comprising:
    preparing a transportation service database including route information of means of transportation, the route information including information on each stop station on the route;
    preparing a stop-station fingerprint database by linking a WiFi fingerprint at each stop station on the route (hereinafter referred to as 'stop-station WiFi fingerprint') with identification (ID) information of each corresponding stop station, the WiFi fingerprint including at least one pair of ID information and received signal strength of access point (AP) included in a received WiFi signal;
    sequentially recognizing two or more stop stations which the means of transportation in motion approaches by repeatedly comparing a WiFi fingerprint acquired by a mobile device located in the means of transportation (hereinafter referred to as 'acquired WiFi fingerprint') with the stop-station WiFi fingerprint in the stop-station fingerprint database; and estimating a location of the means of transportation in motion based on the two or more stop stations and the route information in the transportation service database and recognizing the estimated location of the means of transportation as a location of the mobile device.

8. The method of claim 7, wherein the transportation service database further comprises timetable information of the means of transportation, and the method further comprising:

correcting the timetable information based on the estimated location of the means of transportation in motion;

estimating a location of the means of transportation in motion based on the corrected timetable information; and recognizing the estimated location of the means of transportation as a location of the mobile device.

9. The method of claim 7, wherein the recognized location of the mobile device is used to announce through the mobile device when the means of transportation approaches a stop station which is input by a user of the mobile device beforehand.

10. A method of estimating a location of a mobile device using a WiFi signal in a location-based service system, the method comprising:

preparing a stop-station fingerprint database by linking a WiFi fingerprint at each stop station on a route of means of transportation (hereinafter referred to as 'stop-station WiFi fingerprint') with identification (ID) information of each corresponding stop station, the WiFi fingerprint including at least one pair of ID information and received signal strength of access point (AP) included in a received WiFi signal;

receiving a WiFi fingerprint acquired by a mobile device located in the means of transportation (hereinafter referred to as 'acquired WiFi fingerprint');

recognizing a stop station by comparing the acquired WiFi fingerprint with the stop-station WiFi fingerprint in the stop-station fingerprint database;

providing a location-based application service based on the recognized stop station; and updating the stop-station fingerprint database using the acquired WiFi fingerprint.

* * * * *